US010977151B2

(12) United States Patent
Harutyunyan et al.

(10) Patent No.: US 10,977,151 B2
(45) Date of Patent: Apr. 13, 2021

(54) PROCESSES AND SYSTEMS THAT DETERMINE EFFICIENT SAMPLING RATES OF METRICS GENERATED IN A DISTRIBUTED COMPUTING SYSTEM

(71) Applicant: VMware, Inc., Palo Alto, CA (US)

(72) Inventors: Ashot Nshan Harutyunyan, Yerevan (AM); Arnak Poghosyan, Yerevan (AM); Naira Movses Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/408,149

(22) Filed: May 9, 2019

(65) Prior Publication Data
US 2020/0356459 A1 Nov. 12, 2020

(51) Int. Cl.
*G06F 11/34* (2006.01)
*G06F 17/18* (2006.01)
*H04L 12/26* (2006.01)

(52) U.S. Cl.
CPC .......... *G06F 11/3466* (2013.01); *G06F 17/18* (2013.01); *H04L 43/08* (2013.01)

(58) Field of Classification Search
CPC ......... H04L 67/18; H04L 12/00; H04L 25/40; H04L 27/0008; H04L 27/361; H04L 27/364; H04L 27/365; H04L 27/366; H04L 27/367; H04L 41/0266; H04L 41/069; H04L 41/12; H04L 43/024; H04L 43/0817; H04L 43/0876; H04L 43/106; H04L 51/32; H04L 67/10; H04L 67/1002; H04L 43/08; G06F 19/00; G06F 19/3418;
(Continued)

(56) References Cited

U.S. PATENT DOCUMENTS

2007/0025485 A1* 2/2007 Caselli ................... G05B 21/02
375/355
2014/0089402 A1* 3/2014 Liyanage ................ H04L 51/32
709/204
(Continued)

OTHER PUBLICATIONS

Sarah Johansson and Jimmy Johansson, Interactive Dimensionality Reduction Through User-defined Combinations of Quality Metrics, Nov./Dec. 2009, IEEE Transactions on visualization and Computer Graphics, vol. 15, No. 6, pp. 993-996 (Year: 2009).*

*Primary Examiner* — Djenane M Bayard

(57) ABSTRACT

Processes and systems described herein are directed to determining efficient sampling rates for metrics generated by various different metric sources of a distributed computing system. In one aspect, processes and systems retrieve the metrics from metric data storage and determine non-constant metrics of the metrics generated by the various metric sources. Processes and systems separately determine an efficient sampling rate for each non-constant metric by constructing a plurality of corresponding reduced metrics, each reduced metric comprising a different subsequence of the corresponding metric. Information loss is computed for each reduced metric. An efficient sampling rate is determined for each metric based on the information losses created by constructing the reduced metrics. The efficient sampling rates are applied to corresponding streams of run-time metric values and may also be used to resample the corresponding metric already stored in metric data storage, reducing storage space for the metrics.

21 Claims, 32 Drawing Sheets

(58) Field of Classification Search
CPC ......... G06F 19/3481; G06F 2209/5019; G06F 9/5077; G06F 17/18; G06F 9/4856; G06F 16/285; G06F 1/3228; G06F 1/3296; G06F 2209/5022; G06F 9/3877; G06F 9/4843; G06F 9/4887; G06F 9/5094; G06F 11/3006; G06F 11/3409; G06F 11/3442; G06F 11/3452; G06F 16/24568; G06F 16/24578; G06F 16/2474; G06F 16/283; G06F 16/335; G06F 16/36; G06F 16/9535; G06F 17/142; G06F 1/3209; G06F 1/3234; G06F 2009/4557; G06F 2009/45583; G06F 2009/45595; G06F 2209/815; G06F 2201/835; G06F 2209/508; G06F 30/20; G06F 3/017; G06F 40/30; G06F 9/45558; G06F 9/5022; G06F 9/5027; G06F 9/5061; G06F 9/5083; G06F 9/5088; G06F 11/3466

See application file for complete search history.

(56) References Cited

U.S. PATENT DOCUMENTS

| | | |
|---|---|---|
| 2017/0061501 A1* | 3/2017 | Horwich ............ G06Q 30/0275 |
| 2019/0034827 A1* | 1/2019 | Grechka ................ G06N 20/00 |
| 2019/0050710 A1* | 2/2019 | Wang ........................ G06N 3/04 |
| 2019/0250949 A1* | 8/2019 | Chen ........................ G06F 9/505 |

* cited by examiner

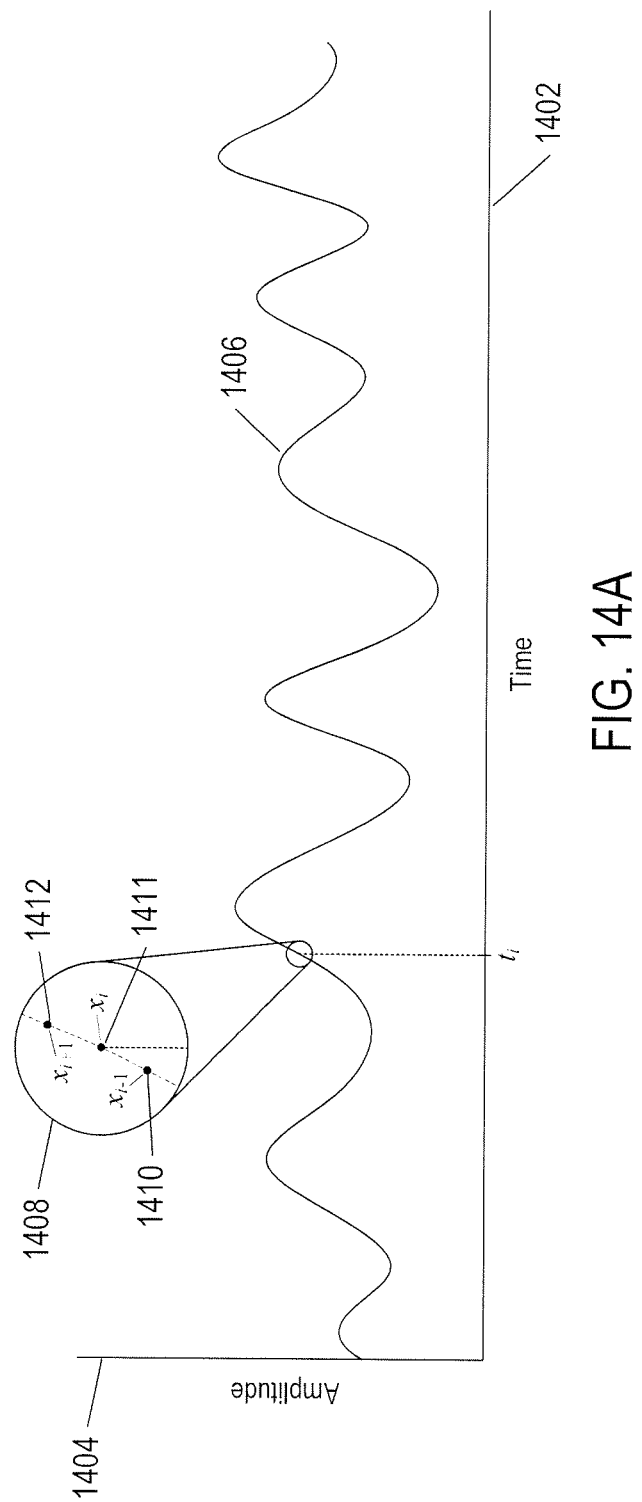

PROCESSES AND SYSTEMS THAT DETERMINE EFFICIENT SAMPLING RATES OF METRICS GENERATED IN A DISTRIBUTED COMPUTING SYSTEM

TECHNICAL FIELD

This disclosure is directed to automated processes and systems that determine efficient sampling rates of metrics generated by metric sources of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with numerous components that provide enormous computational bandwidths and data-storage capacities. These large, distributed computing systems are made possible by advances in computer networking, distributed operating systems and applications, data-storage appliances, computer hardware, and software technologies.

Because distributed computing systems have an enormous number of computational resources, various management systems have been developed to collect performance information about the resources. For example, a typical management system may collect hundreds of thousands, or millions, of streams of time-series metric data, called "metrics." A metric may represent the amount of a resource in use over time, an error rate, data transmission rate, or collective usage of multiple resources over time. The metrics are typically collected at high sampling rates to monitor, as close as possible, real-time performance of a distributed computing infrastructure, such as performance of hardware and applications running in a distributed computing system. Ideally, high sampling rates enable real-time identification of abnormalities that impact stability and continuous availability of services. For example, when an abnormality is identified in real time, IT administrators can execute remedial measures to correct the problem before the abnormality creates a significant interruption in services. However, collecting large numbers of metrics at high sampling rates creates problems, such as increasing costs of storing of metric data and delays detection of performance abnormalities because of time delays created by having to process large numbers of metric data values collected per unit time. IT administrators seek processes and systems that decreases the cost of storing metrics and reduces the time to identifying performance problems without losing vital information used to detect abnormal behavior of resources.

SUMMARY

Processes and systems described herein are directed to determining efficient sampling rates for metrics generated by various different metric sources of a distributed computing system. In one aspect, processes and systems retrieve the metrics from metric data storage. Each metric is evaluated to determine whether the metric is a non-constant metric. Processes and systems determine an efficient sampling rate for each non-constant metric by constructing a plurality of corresponding reduced metrics. Each reduced metric comprises a different subsequence of the corresponding metric. An information loss is computed for each reduced metric. The information loss quantitatively represents an amount of information lost in constructing a reduced metric from a metric. Processes and systems determine an efficient sampling rate for each metric based on the information losses created by constructing the corresponding reduced metrics. The efficient sampling rates are applied to streams of run-time metric values of the corresponding metrics, reducing storage space of the streams of run-time metric values. The efficient sampling rates may also be used to resample the corresponding metrics already stored in metric data storage, reducing storage space of the metrics. Processes and systems do not reduce the sampling rates of metrics that exhibit a high variability over time. Processes and systems avoid information losses by leaving sampling rates of high variability metrics unchanged. Sampling rates of high variability metrics that are left unchanged are efficient sampling rates.

DESCRIPTION OF THE DRAWINGS

FIG. 14A shows a plot of an example metric represented as a sequence of time series data associated with a resource of a distributed computing system.

DETAILED DESCRIPTION

This disclosure is directed to automated computational processes and systems that determine efficient sampling rates of corresponding metrics generated by metric sources of a distributed computing system. In a first subsection, computer hardware, complex computational systems, and virtualization are described. Processes and systems for determining efficient sampling rates of corresponding metrics are described below in a second subsection.

Computer Hardware, Computational Systems, and Virtualization

The term "abstraction" is not, in any way, intended to mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that "software implemented" functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
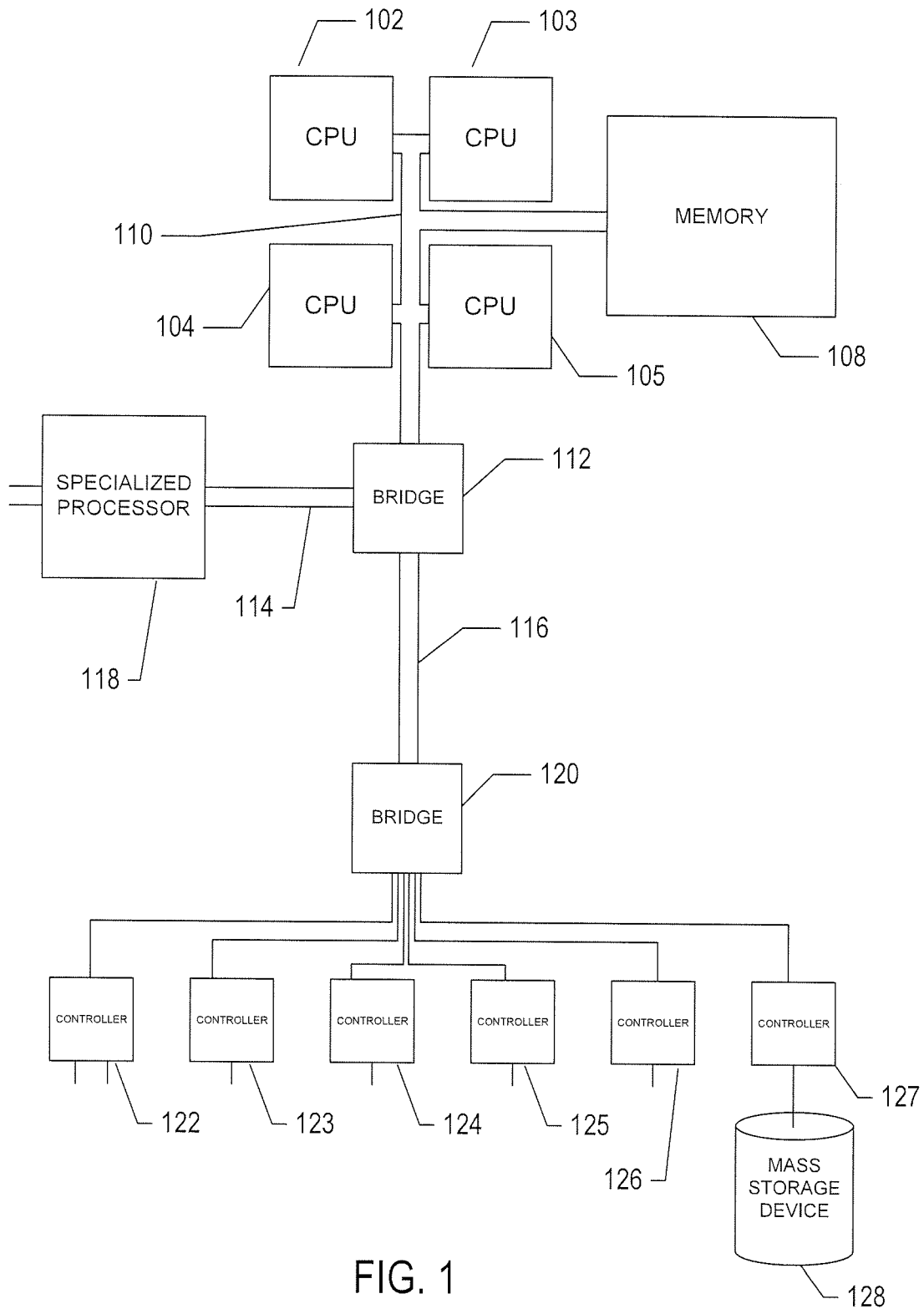
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

There are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
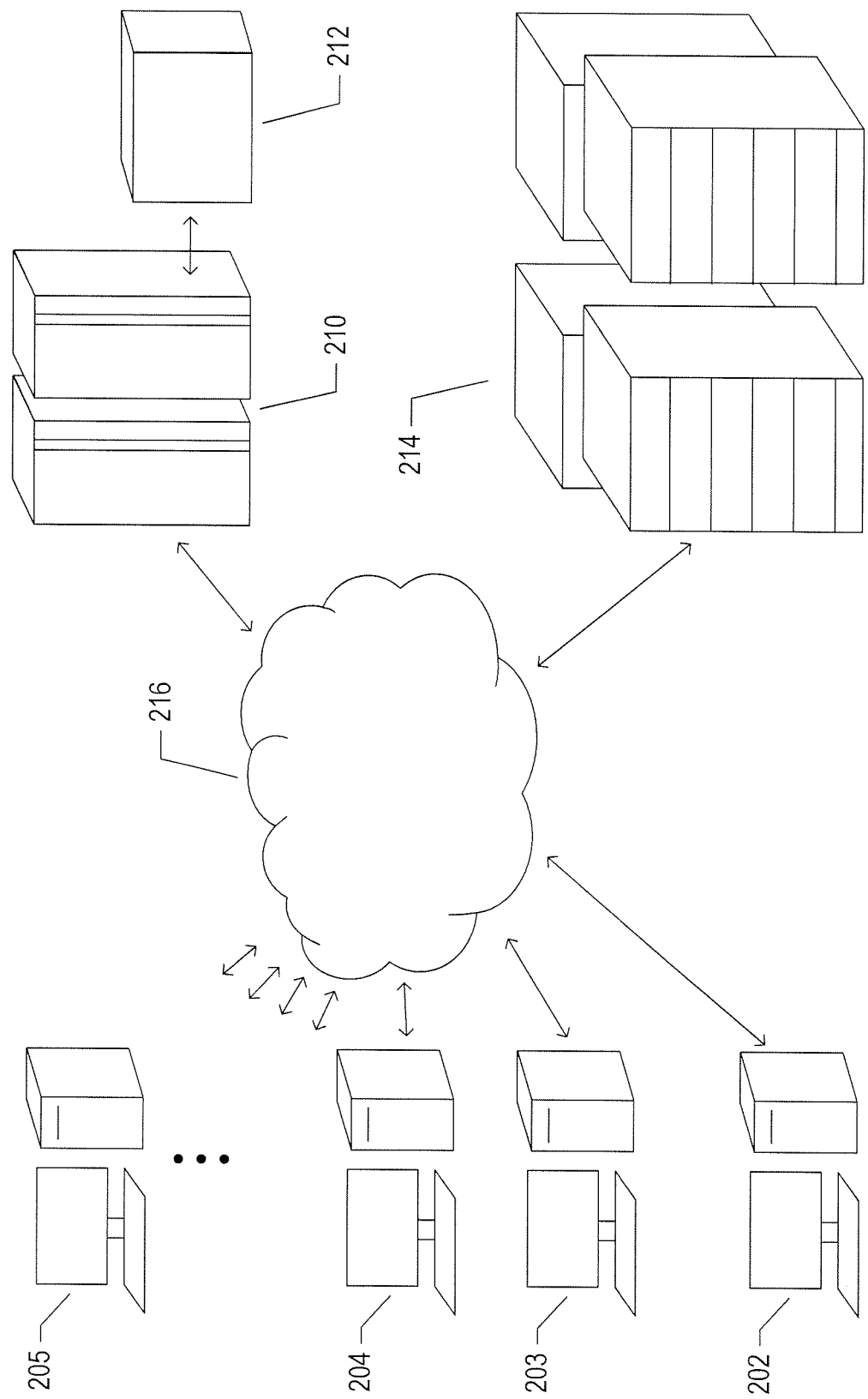
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
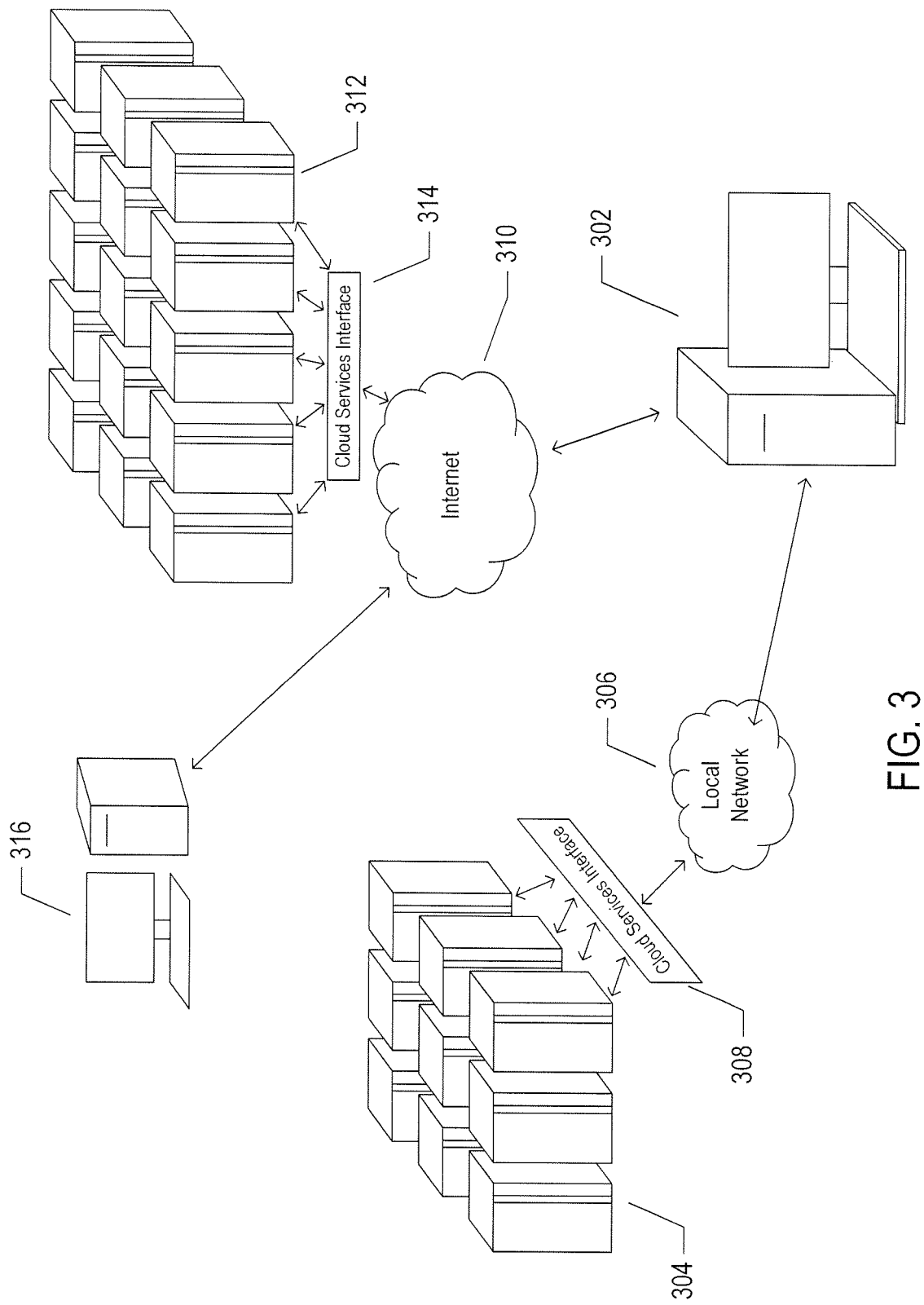
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
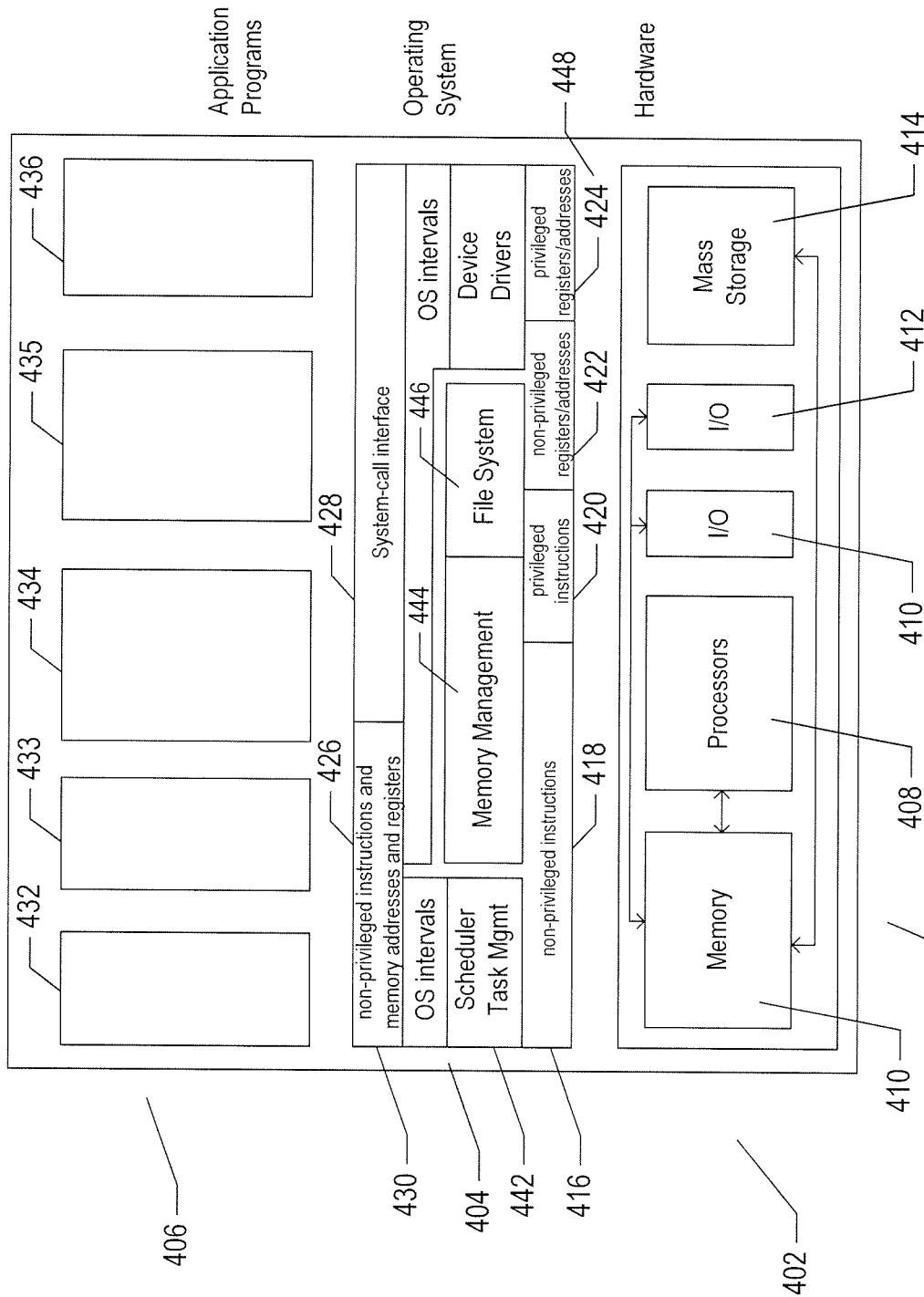
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
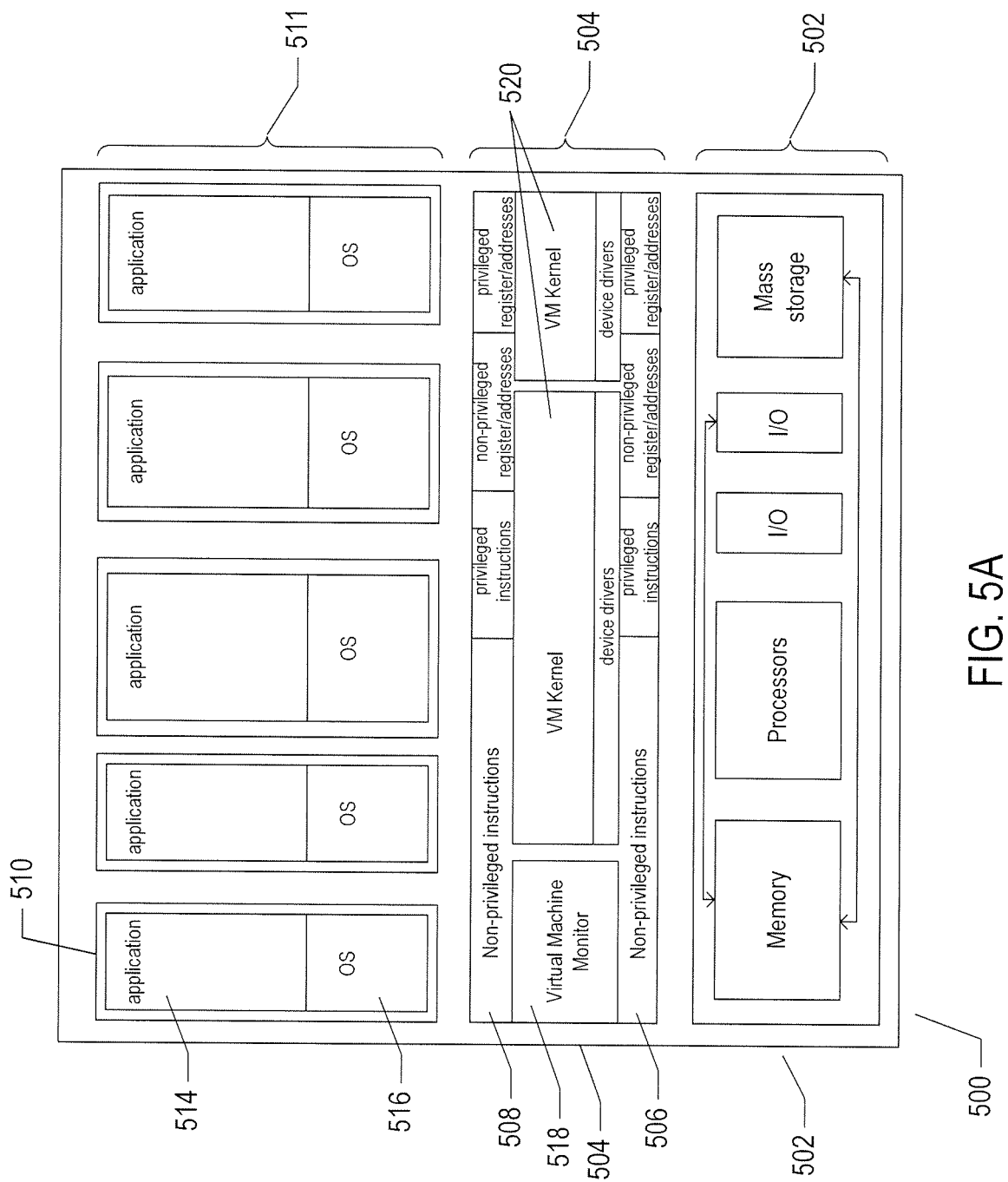
FIGS. 5A-5B show two types of virtual machine ("VM") and VM execution environments.
Figure 5B:
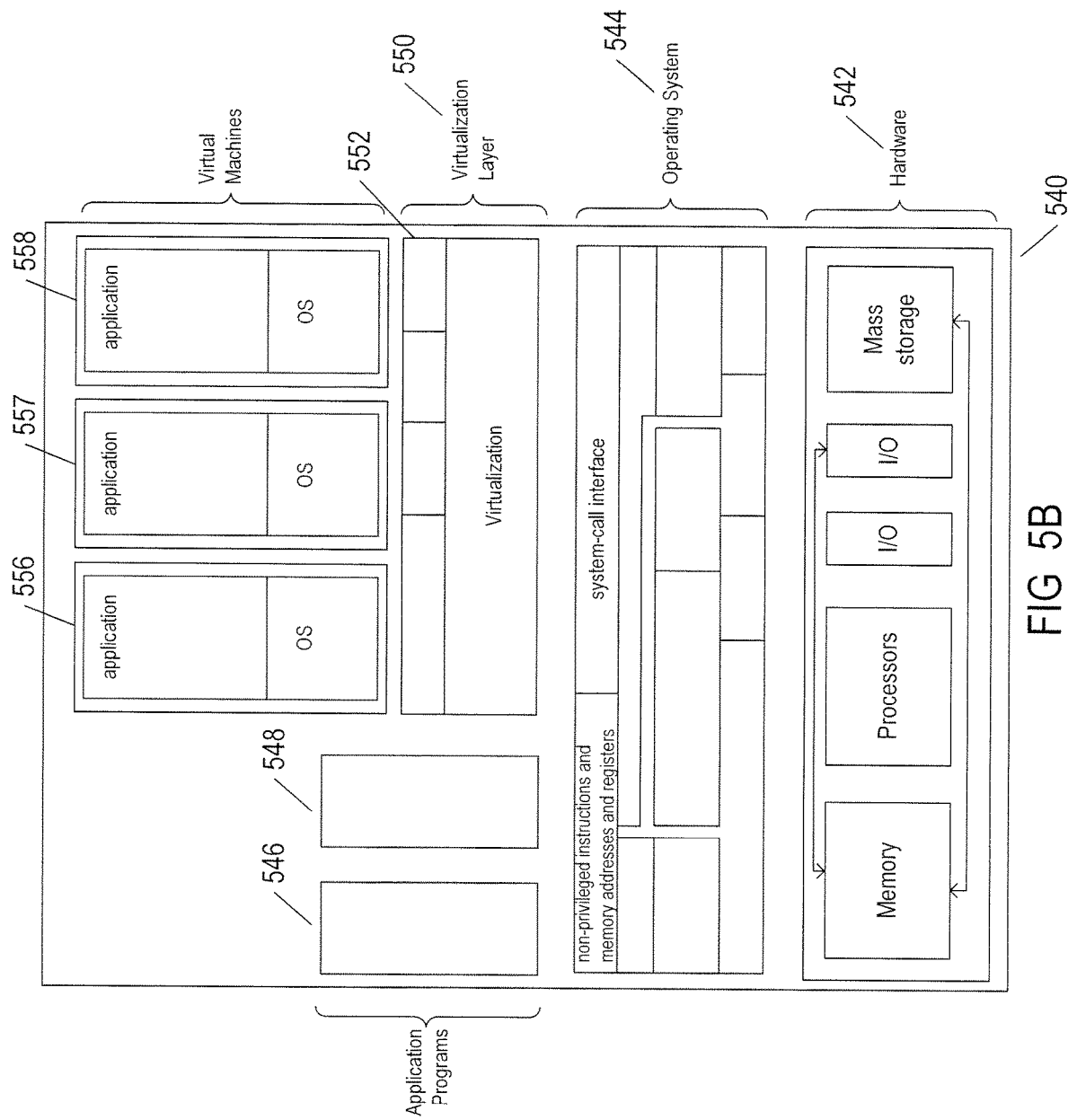

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware.

The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
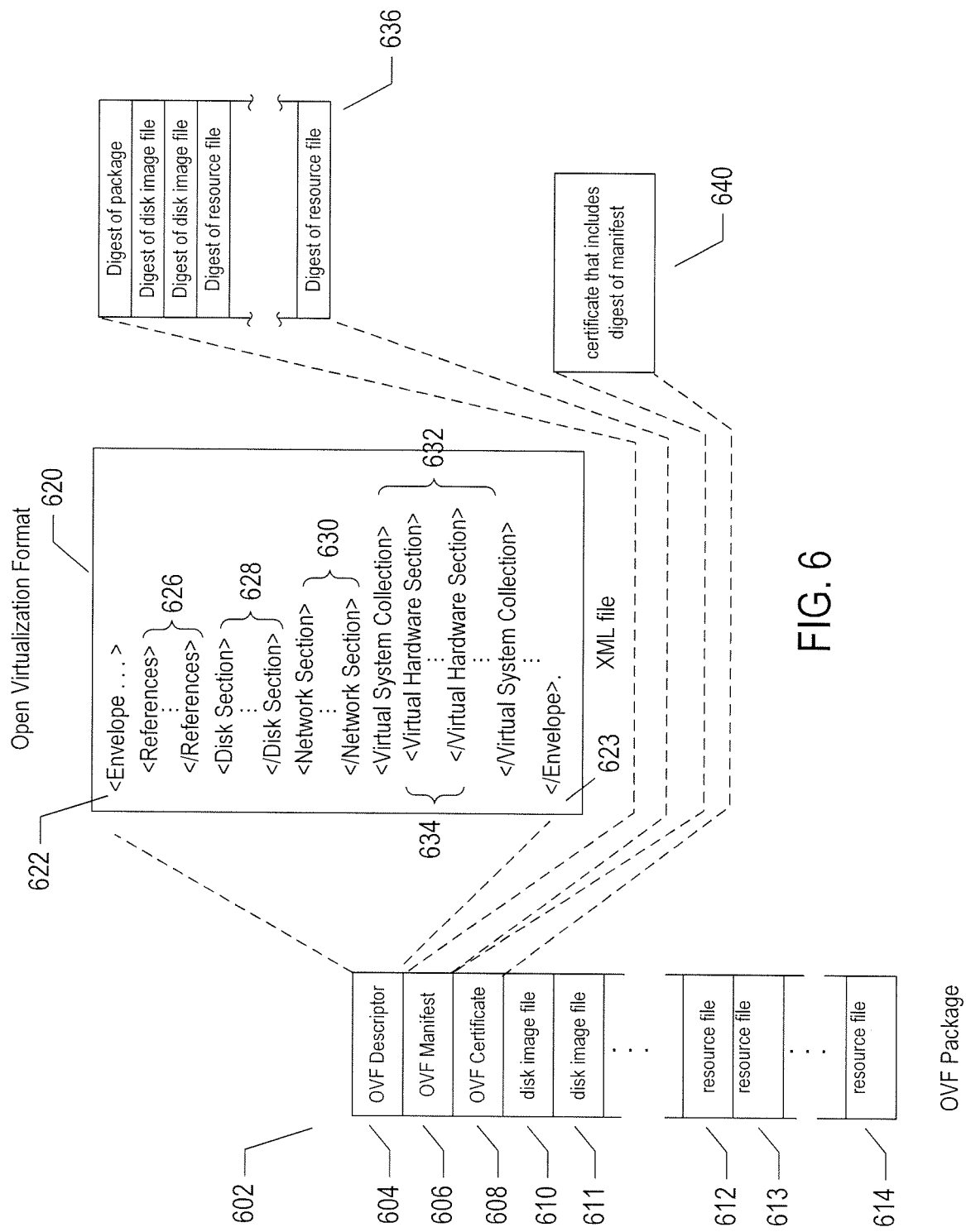
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
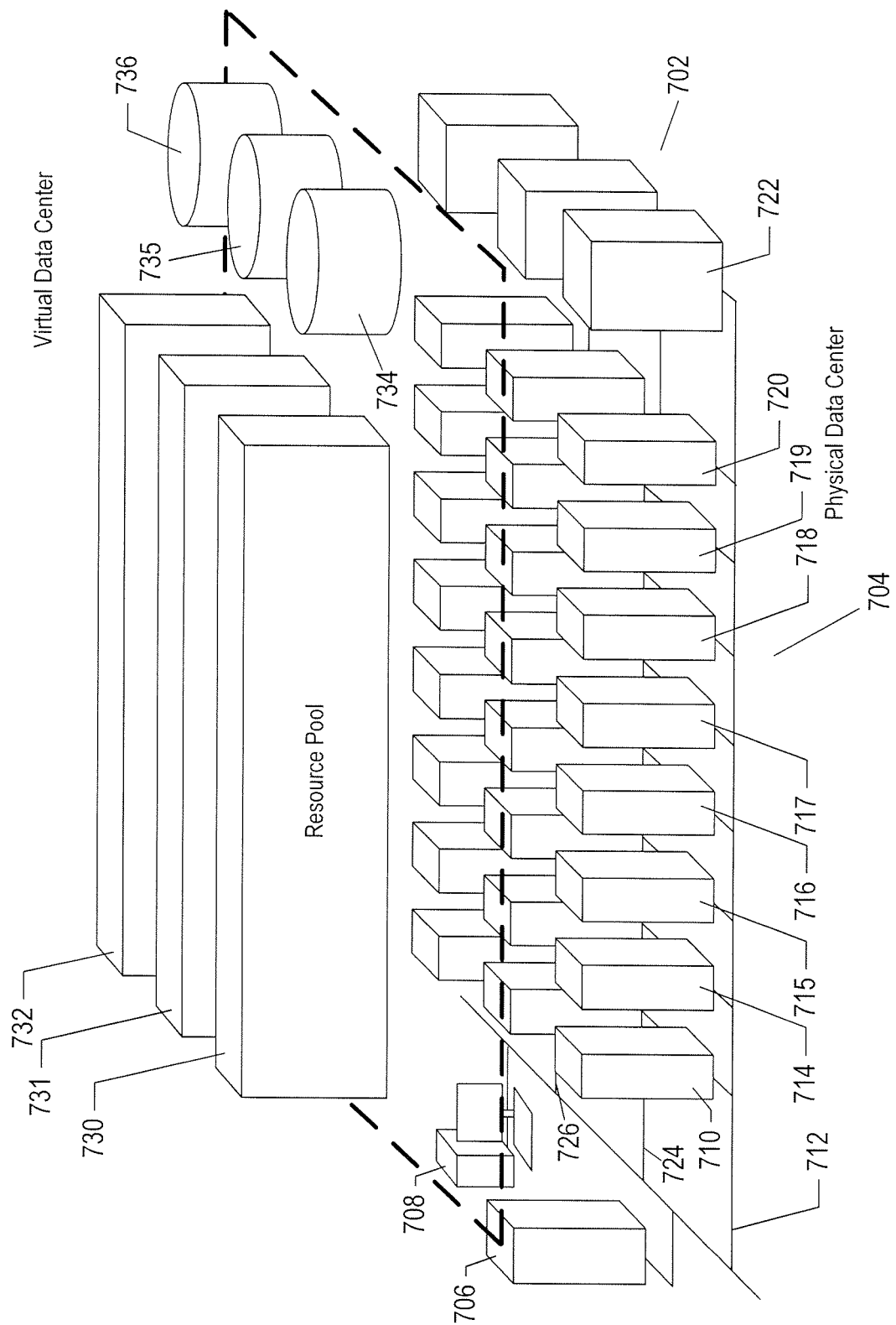
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
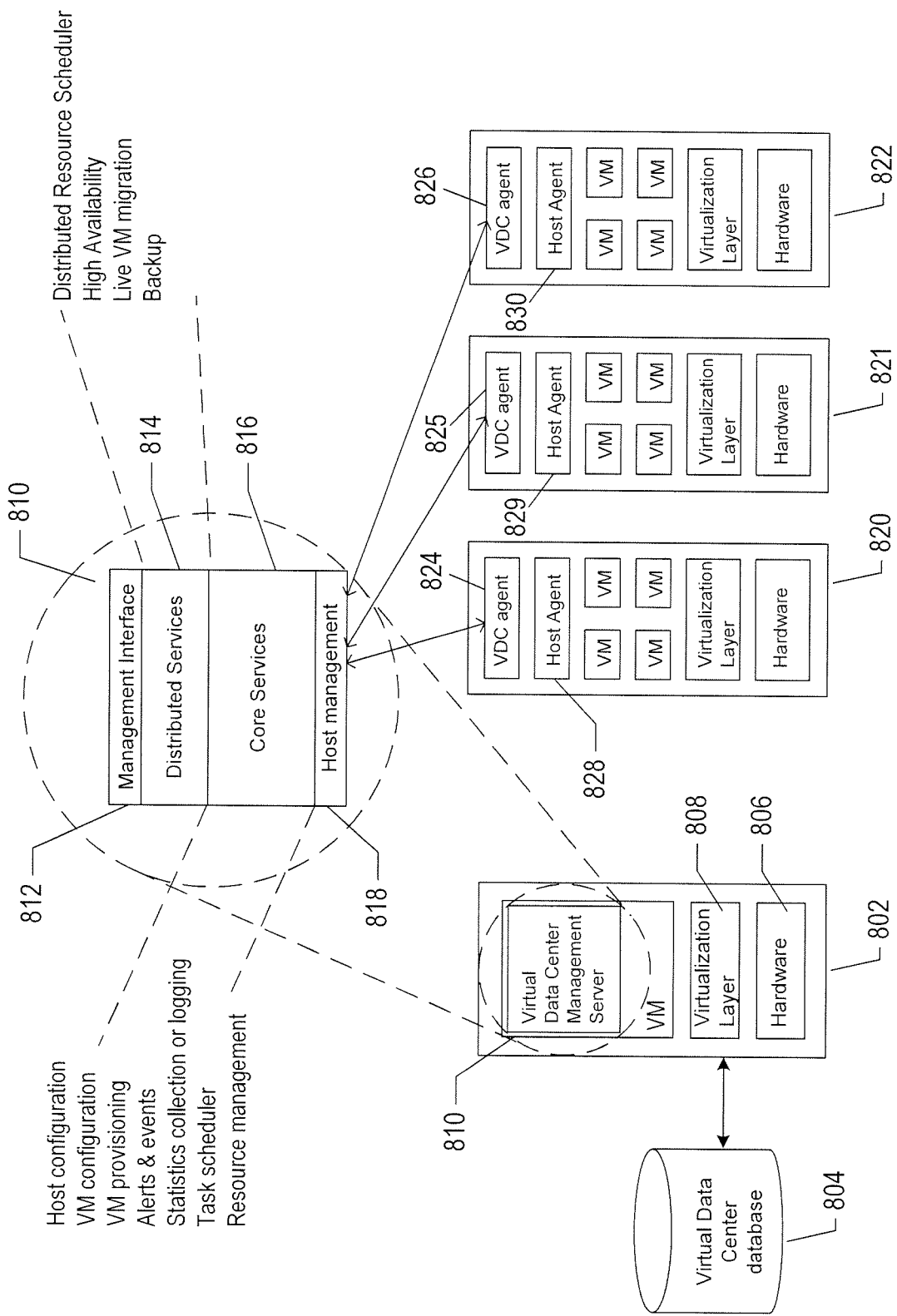
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
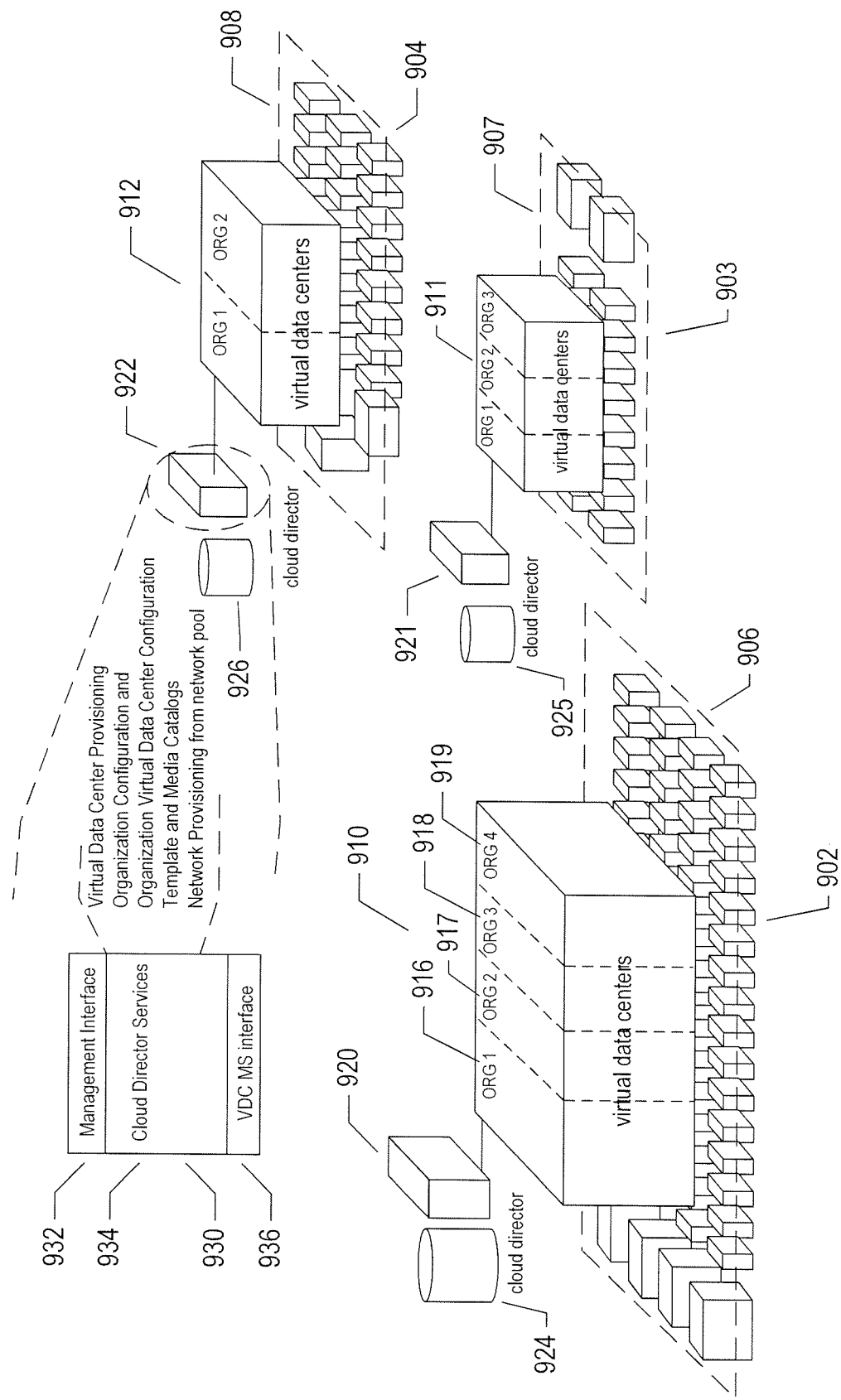
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
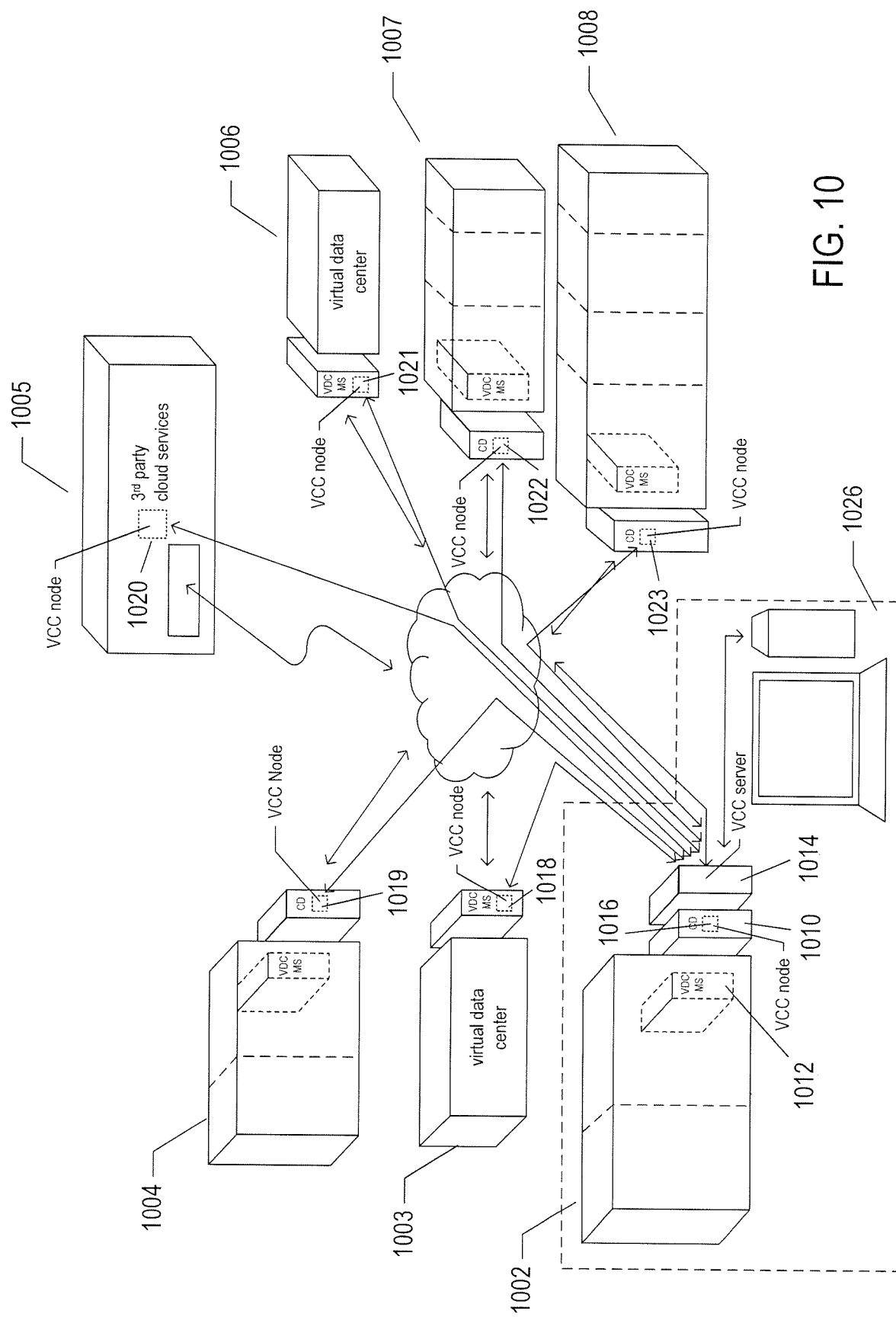
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-

1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system for use by containers. A container is a software package that uses virtual isolation to deploy and run one or more applications that access a shared operating system kernel. Containers isolate components of the host used to run the one or more applications. The components include files, environment variables, dependencies, and libraries. The host OS constrains container access to physical resources, such as CPU, memory and data storage, preventing a single container from using all of a host's physical resources. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
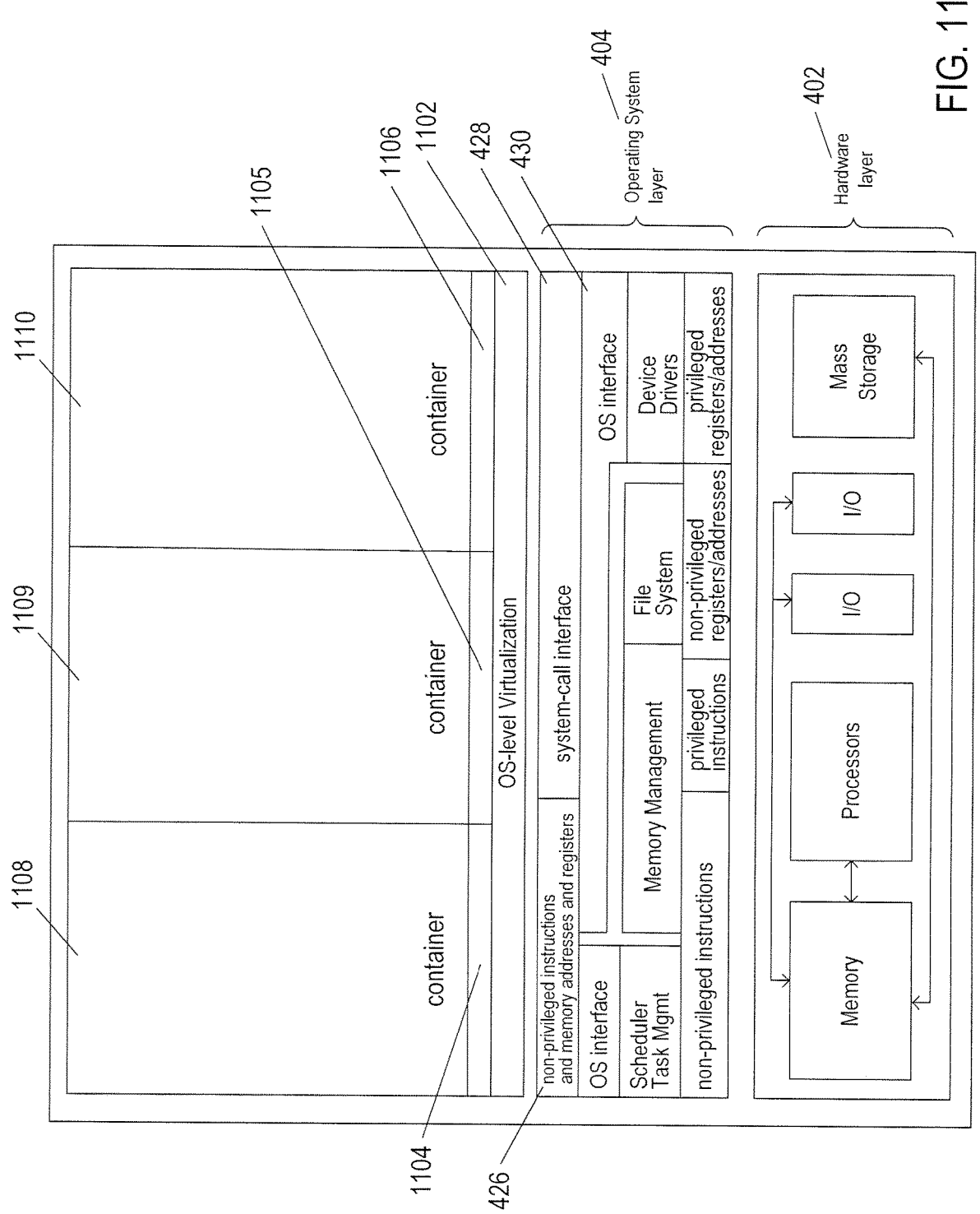
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
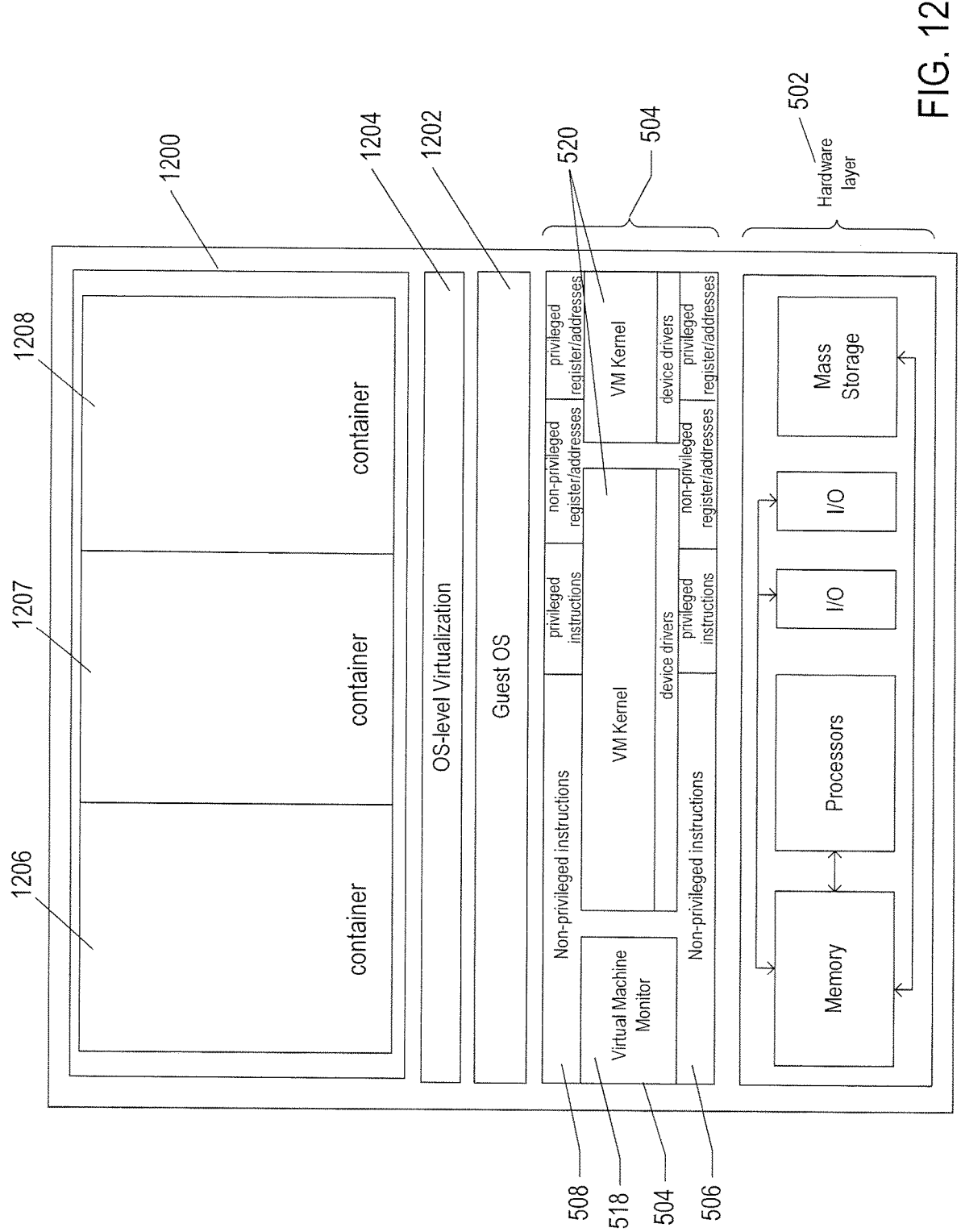
FIG. 12 shows an approach to implementing containers on a VM.

FIG. 12 shows an approach to implementing the containers on a VM. FIG. 12 shows a host computer similar to the host computer shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
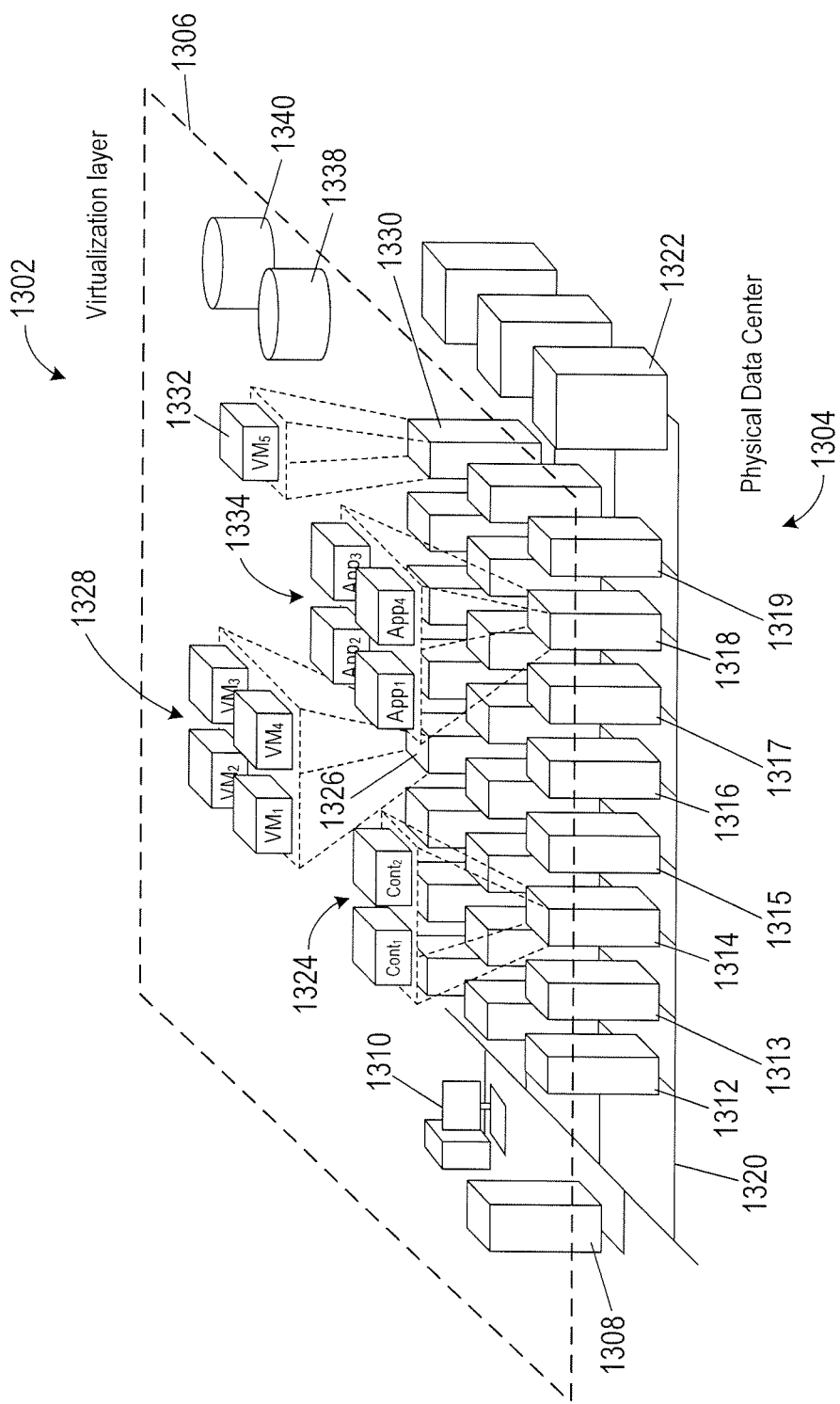
FIG. 13 shows an example of a virtualization layer located above a physical data center.

Processes and Systems for Determining Efficient Sampling Rates of Metrics Generated by Metric Sources of a Distributed Computing System FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including a management server computer 1308, any of various computers, such as PC 1310, on which a virtual-data-center ("VDC") management interface may be displayed to system administrators and other users, server computers, such as server computers 1312-1319, data-storage devices, and network devices. The server computers may be networked together to form networks within the data center 1904. The example physical data center 1304 includes three networks that each directly interconnects a bank of eight server computers and a mass-storage array. For example, network 1320 interconnects server computers 1312-1319 and a mass-storage array 1322. Different physical data centers may include many different types of computers, networks, data-storage systems and devices connected according to many different types of connection topologies. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Certain server computers host VMs and containers as described above. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338.

In the following discussion, the term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources used by a virtual object. For example, a resource may be a virtual processor formed from one or more cores of a multicore processor, virtual memory formed from a portion of physical memory, virtual storage formed from a sector or image of a hard disk drive, a virtual switch, and a virtual router. The term "object" refers to a physical object or a virtual object for which metric data can be collected. Examples of physical objects include a server computer, network device, a workstation, and a PC. Examples of virtual objects include an application, a VM, a virtual network device, and a container. A "complex computational system" is composed of physical and/or virtual objects. A complex computational system may comprise the distributed computing system itself, such a data center, or any physical and/or virtual objects of a distributed computing system. For example, a complex computational system may be a single server computer, a cluster of server computers, or a network of server computers. A complex computational system may be a set of VMs, containers, applications, or a VDC of a tenant. A complex computational system may be a set of physical objects and the virtual objects hosted by the physical objects.

Automated processes and systems described herein are implemented in a monitoring server that collects numerous streams of time-dependent metric data generated by various different metric sources to monitor resources, objects, and complex computational systems of a distributed computing system. Each stream of metric data is time series data generated by a metric source. A metric source may be an operating system of an object, an object, or a resource. A stream of metric data associated with a resource comprises a sequence of time-ordered metric values that are recorded at spaced points in time called "time stamps." A stream of metric data is simply called a "metric" and is denoted by $$v=(x_i)_{i=1}^{N_v}=(x(t_i))_{i=1}^{N_v} \quad (1)$$

where $N_v$ is the number of metric values in the sequence;

$x_i=x(t_i)$ is a metric value;

$t_i$ is a time stamp indicating when the metric value was recorded in a data-storage device; and subscript i is a time stamp index i=1, . . . , $N_v$.

FIG. 14A shows a plot of an example metric associated with a resource. Horizontal axis 1402 represents time. Vertical axis 1404 represents a range of metric value amplitudes. Curve 1406 represents a metric as time series data. In practice, a metric comprises a sequence of discrete metric values in which each metric value is recorded in a data-storage device. FIG. 14 includes a magnified view 1408 of three consecutive metric values represented by points. Each point represents an amplitude of the metric at a corresponding time stamp. For example, points 1410-1412 represent three consecutive metric values (i.e., amplitudes) $x_{i-1}$, $x_i$, and $x_{i+1}$ recorded in a data-storage device at corresponding time stamps $t_{i-1}$, $t_i$, and $t_{i+1}$. The example metric may represent usage of a physical or virtual resource. For example, the metric may represent CPU usage of a core in a multicore processor of a server computer over time. The metric may represent the amount of virtual memory a VM uses over time. The metric may represent network throughput for a server computer. Network throughput is the number of bits of data transmitted to and from a physical or virtual object and is recorded in megabits, kilobits, or bits per second. The metric may represent network traffic for a server computer. Network traffic at a physical or virtual object is a count of the number of data packets received and sent per unit of time.

Figure 14B:
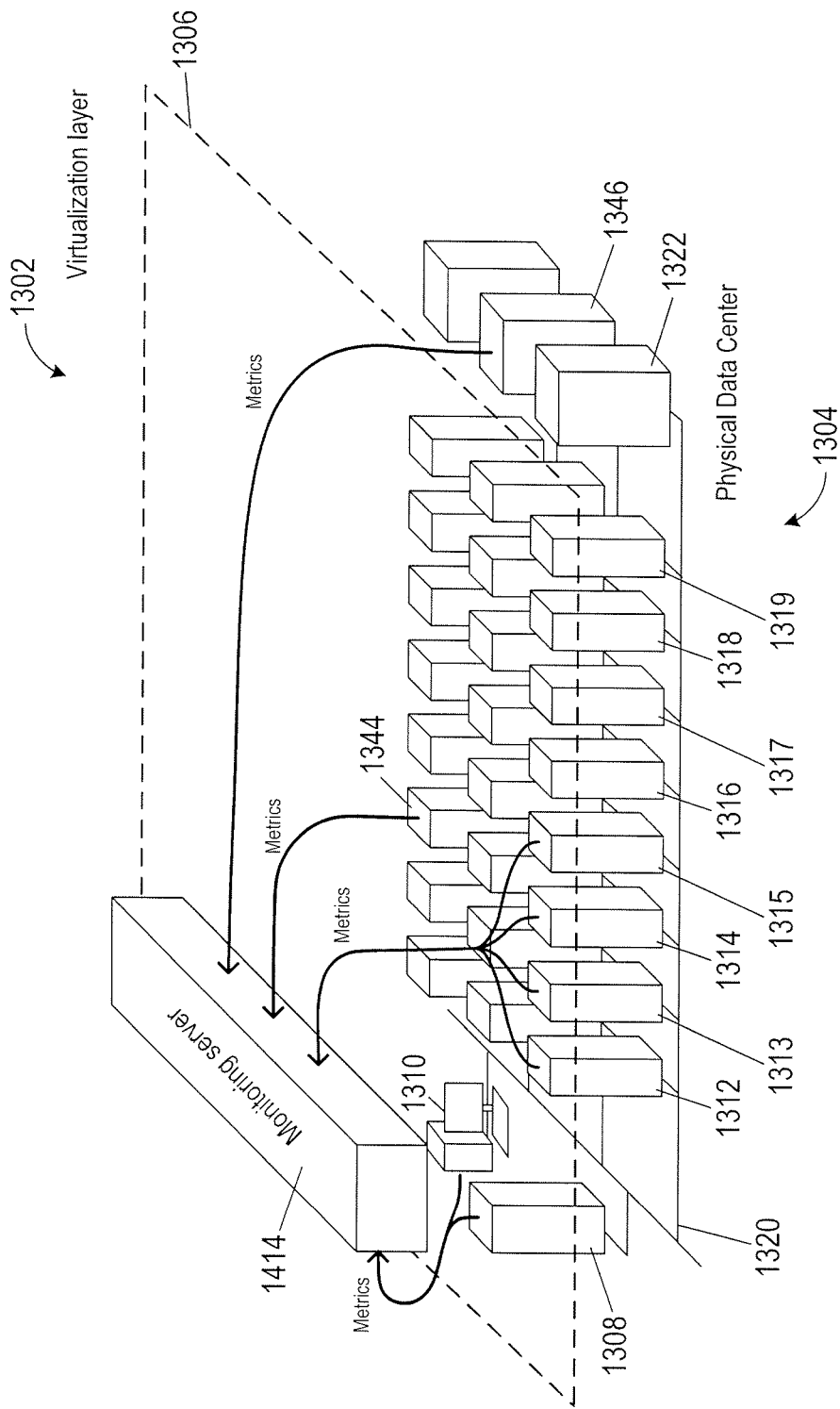
FIGS. 14B-14C show examples of metrics transmitted from physical and virtual objects of a distributed computing system to a monitoring server.
Figure 14C:
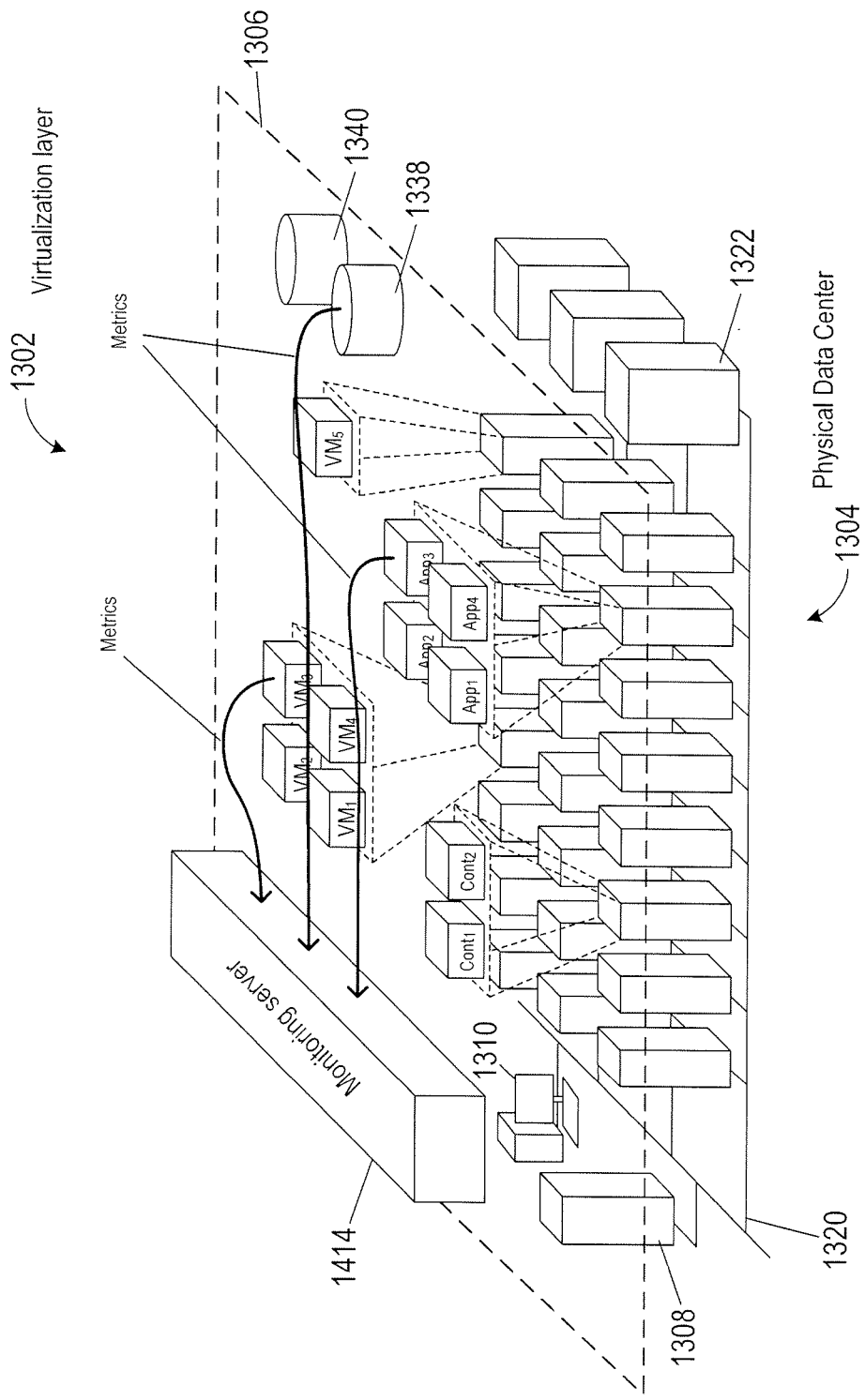

In FIGS. 14B-14C, a monitoring server 1414 collects numerous metrics associated with numerous physical and virtual resources. The monitoring server 1414 may be implemented in one or more VMs to collect and process the metrics as described below. As shown in FIGS. 14B-14C, directional arrows represent metrics sent from physical and virtual resources to the monitoring server 1414. In FIG. 14B, PC 1310, server computers 1308 and 1312-1315, and mass-storage array 1346 send metrics to the monitoring server 1414. Clusters of server computers may also send metrics to the monitoring server 1414, such as cluster of server computers 1312-1315 that send metrics to the monitoring server 1414. In FIG. 14C, the operating systems, VMs, containers, applications, and virtual storage may independently send metrics to the monitoring server 1414, depending on when the metrics are generated. For example, certain objects may metric values as the metric values are generated while other objects may send sequences of metric values in blocks at certain times or in response to a request from the monitoring server 1414.

Physical and virtual objects may generate tens, hundreds, or thousands of associated metrics that are sent to the monitoring server 1414. For example, metric sources of a single server computer may send to the monitoring server 1414 hundreds of metrics that represent usage of each core of a multicore core processor, memory usage, storage usage, network throughput, error rates, datastores, disk usage, average response times, peak response times, thread counts, and power usage, just to name a few. A single virtual object, such as a VM, is a metric source that may send to the monitoring server 1414 hundreds of associated metrics that monitor both physical and virtual resource usage, such as virtual CPU usage, virtual memory usage, virtual disk usage, virtual storage space, number of data stores, average and peak response times for various physical and virtual resources of the VM, network throughput, and power usage, just to name a few.

Each metric may have a different associated sampling rate, which is the number of metric values recorded per unit of time. For example, certain metrics, such as CPU usage and memory usage, may be recorded every second, every tenth of a second, or every hundredth of a second. By contrast, other metrics, such as error rates and power usage, may be recorded every hour or two hours.

Processes and systems omit constant and nearly constant metrics because constant and nearly constant metrics are not useful in identifying abnormal performance of a resource, an object, or a complex computational system. In certain implementations, metrics with fewer than a fixed percentage of non-constant metric values are omitted. For example, metrics with less than 5% non-constant metric values may be omitted. In other implementations, constant or nearly constant metrics may be identified by the magnitude of the standard deviation of each metric over time. The standard deviation is a measure of the amount of variation or degree of variability of a metric. A large standard deviation indicates large variability in the metric. A small standard deviation indicates low variability in the metric. The standard deviation is compared to a variability threshold to determine whether the metric has acceptable variation for detection of abnormal behavior of an object or a complex computational system.

The standard deviation of a metric may be computed by:

$$\sigma = \sqrt{\frac{1}{N_v} \sum_{i=1}^{N_v} (x_i - \mu)^2} \qquad (2a)$$

where the mean of the metric is given by $$\mu = \frac{1}{N_v} \sum_{i=1}^{N_v} x_i \qquad (2b)$$

When the standard deviation $\sigma > \varepsilon_{st}$, where $\varepsilon_{st}$ is a variability threshold (e.g., $\varepsilon_{st} = 0.01$), the metric v is non-constant and is retained. Otherwise, when the standard deviation $\sigma \leq \varepsilon_{st}$, the metric v is constant and is omitted from determining the state of the complex computational system.

Figure 15A:
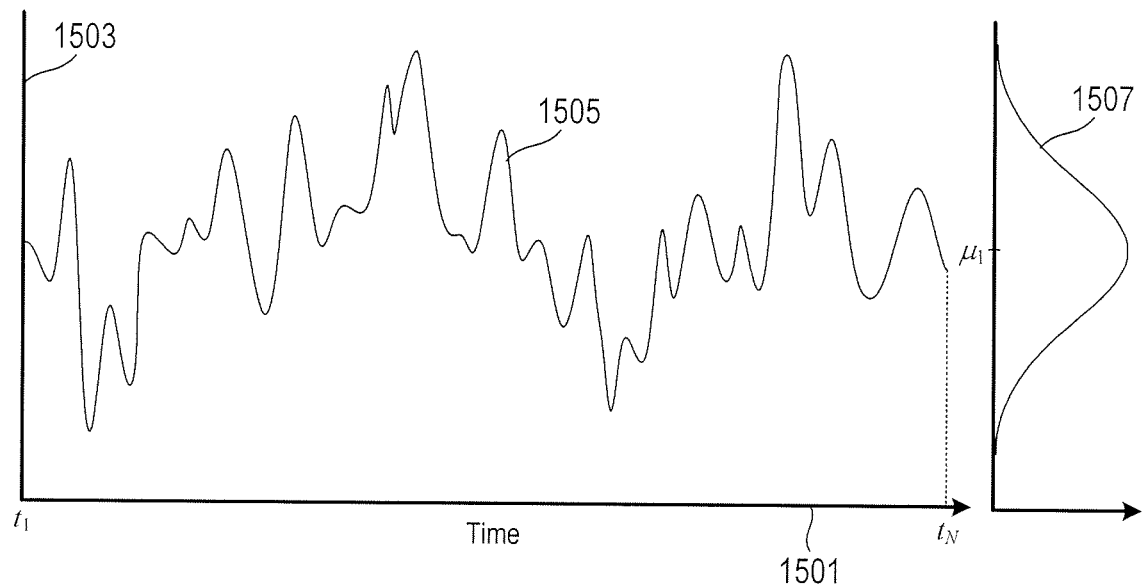
FIGS. 15A-15B show plots of example non-constant and constant metrics over time.
Figure 15B:
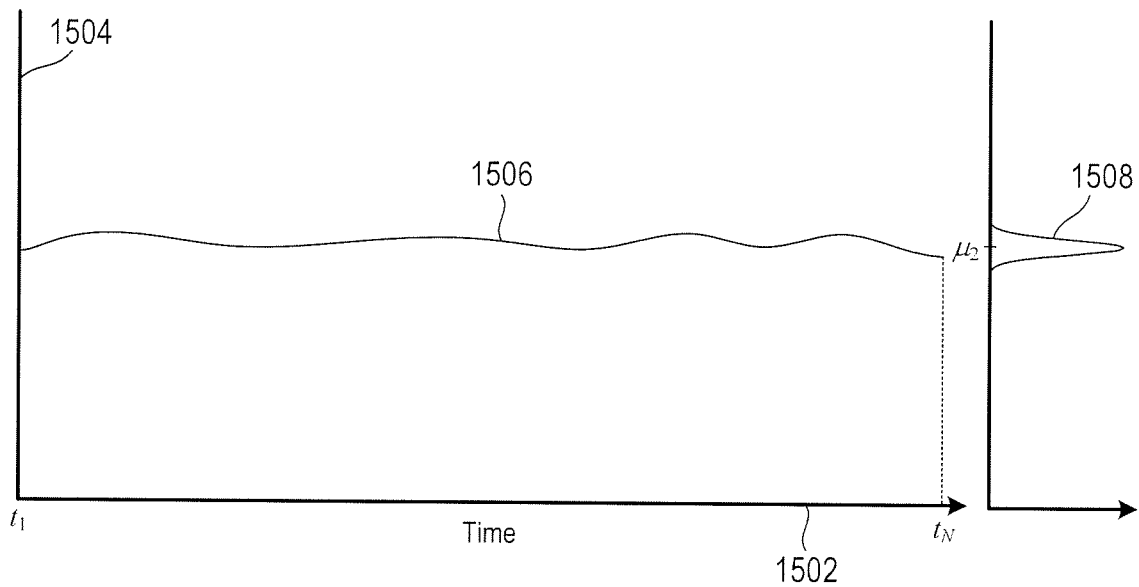

FIGS. 15A-15B show plots of example non-constant and constant metrics over time. Horizontal axes 1501 and 1502 represent time. Vertical axis 1503 represents a range of metric values for a first metric $v_1$. Vertical axis 1504 represents the same range of metric values for a second metric $v_2$. Curve 1505 represents the metric $v_1$ over a time interval between time stamps $t_1$ and $t_N$. Curve 1506 represents the metric $v_2$ over the same time interval. FIG. 15A includes a plot an example first distribution 1507 of the first metric centered about a mean value $\mu_1$. FIG. 15B includes a plot an example second distribution 1508 of the second metric centered about a mean value $\mu_2$. The distributions 1507 and 1508 reveal that the first metric 1505 has a much higher degree of variability than the second metric, which is nearly constant over the time interval.

Figure 16:
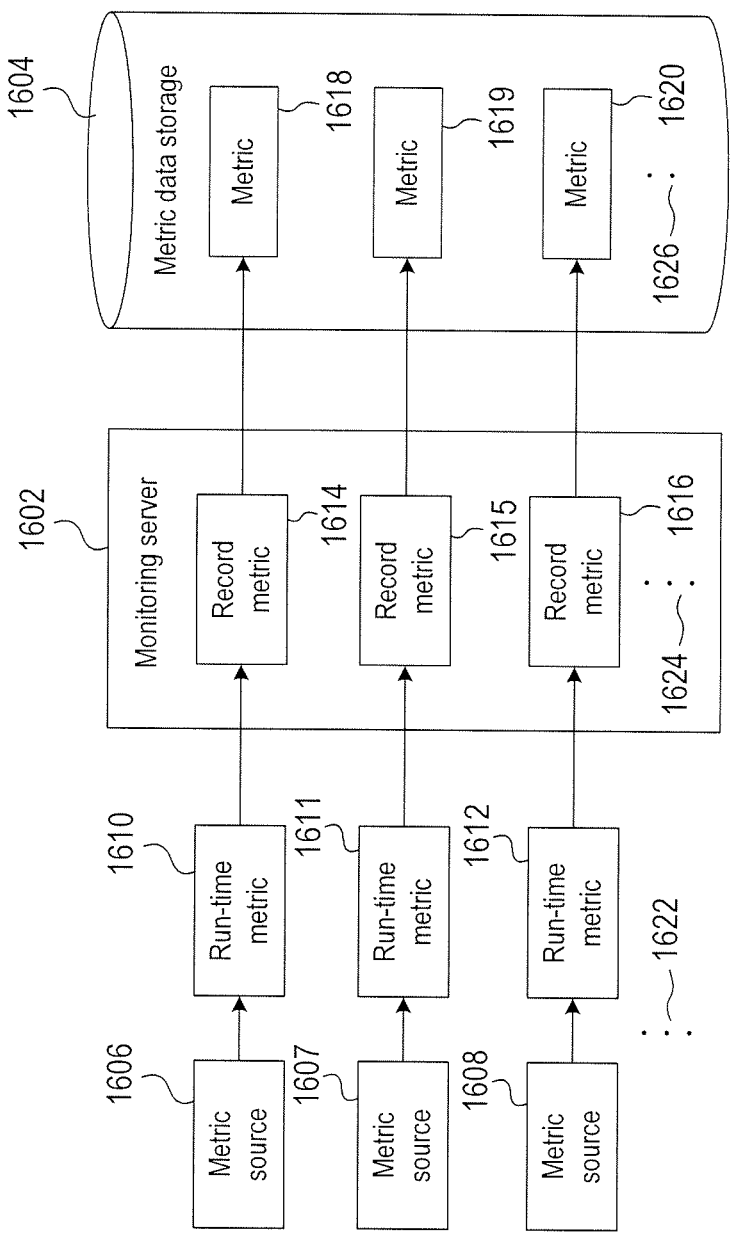
FIG. 16 shows an example of a monitoring server that records metrics generated by various different metric sources in metric storage.

A typical monitoring server collects and stores metrics at high sampling rates to ideally monitor, in real time, dynamic performance of resources, objects, and complex computational systems, resulting in large amounts of storage space dedicated to storing metrics. FIG. 16 shows an example of a monitoring server 1602 that records metrics generated by various different metric sources in metric data storage 1604. The metric sources 1606-1608 generate corresponding run-time metrics 1610-1612. Blocks 1614-1616 represent separate storage operations that each receive and record the run-time metrics 1620-1612 in the metric data storage 1804 as corresponding stored metrics 1618-1620. For the sake of simplicity, ellipsis 1622 represents additional metric sources and run-time metrics, ellipsis 1624 represents separate recording operations performed on the additional metric sources. Ellipsis 1626 represents addition metrics stored in the metric data storage 1604.

Using high sampling rates to record every metric received by the monitoring server is unnecessary for many of the metrics received by the monitoring server. For example, a metric that varies slowly over time relative to the high sampling rate used to record the metric leads to recording redundant metric values (i.e., recording redundant information). On the other hand, a high sampling rate may be necessary to monitor metrics with a high relative variability over time. Storing large numbers of metrics, each with a large number of metric values, leads to increased storage cost and the large density of metric values created by high sampling rates slows detection of performance problems.

Figure 17A:
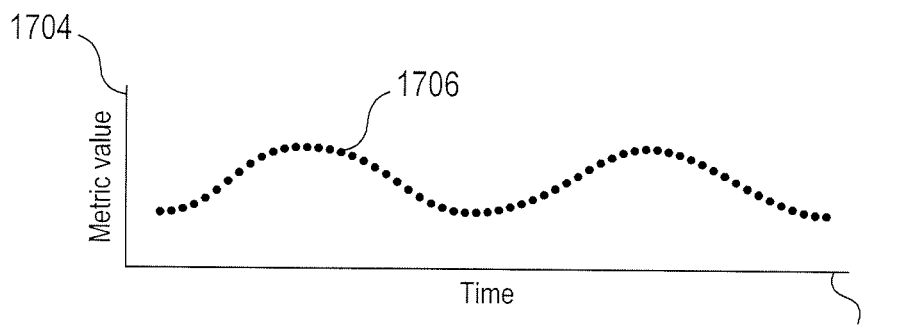
FIGS. 17A-17B show plots of an example low-variation metric sampled at two different sampling rates.
Figure 17B:
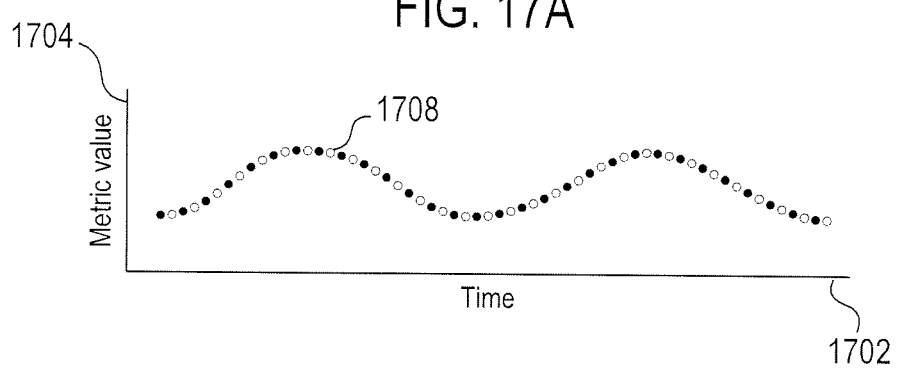

FIGS. 17A-17B show plots of an example low-variation metric sampled at two different sampling rates. Horizontal axes 1702 represent time. Vertical axes 1704 represent a range of metric values. Solid dots, such as solid 1706, represent metric values recorded in a data storage device at regularly spaced time stamps. In FIG. 17A, metric values of the low-variation metric are recorded in the data storage device with a high sampling rate. In FIG. 17B, the metric values of the same metric are recorded in the data storage device with a low sampling rate. Open dots in FIG. 17B, such as open dot 1708, represent metric values that are not recorded due to the low sampling rate. The low-frequency sampling rate records the same variation in the low-variation metric over time with half as many metric values. The low-frequency sampling rate is an example of a sampling rate that may be used to record metric values without losing information regarding variations of the metric over time. The low-frequency sampling rate used to record the metric values in FIG. 17B is a more efficient sampling rate than the high sampling rate used to record the metric values in FIG. 17A because the same information related to variation in the metric overtime are recorded with fewer metric values.

Figure 18A:
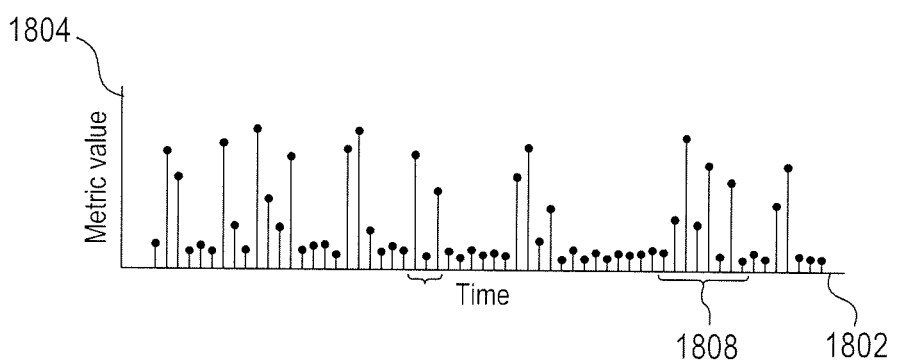
FIGS. 18A-18B show plots of an example high-variation metric sampled at two different sampling rates.
Figure 18B:
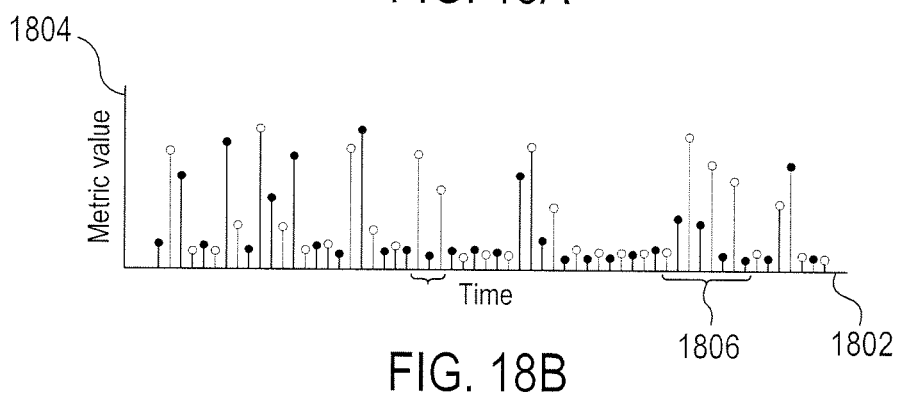

FIGS. 18A-18B show plots of an example high-variation metric sampled at two different sampling rates. Horizontal axes 1802 represent time. Vertical axes 1804 represent a range of metric values. Solid dots represent metric values recorded in a data storage device at time samples. In FIG. 18A, metric values of the high-variation metric are recorded in the data storage device with a high sampling rate. In FIG. 18B, the metric values are recorded in the data storage device with a low sampling rate. Open dots in FIG. 18B represent metric values not recorded as a result of the low sampling rate. The low sampling rate does not record the same variation in the high-variation metric over time as the high sampling rate. For example, omitted metric values in time interval 1806 of FIG. 18B fail to account for variations in the metric in comparison to the metric values recorded in the same time interval 1808 of FIG. 18A. As a result, the low sampling rate used to record the metric in FIG. 18B is less efficient than the high sampling rate used to record the same metric in FIG. 18A.

Processes and systems described below determine an efficient sampling rate for each metric stored in metric data storage. An efficient sampling rate ideally reduces the number of metric values used to record the metric and avoids an unacceptable information loss. Each efficient sampling rate may be used as the sampling rate for recording run-time metric values of the corresponding metric to reduce the amount of storage used to record the metric. Each efficient sampling rate may also be used to resample the corresponding metric already stored in the metric database, thereby reducing the amount of storage space occupied by the metric. On the other hand, reducing the sampling rates of metrics that exhibit a high variability over time may result in unacceptable information losses, as described above with reference to FIG. 18A-18B. Processes and systems avoid such information losses by leaving sampling rates of high variability metrics unchanged. Sampling rates of high variability metrics that are left unchanged are efficient sampling rates.

Figure 19:
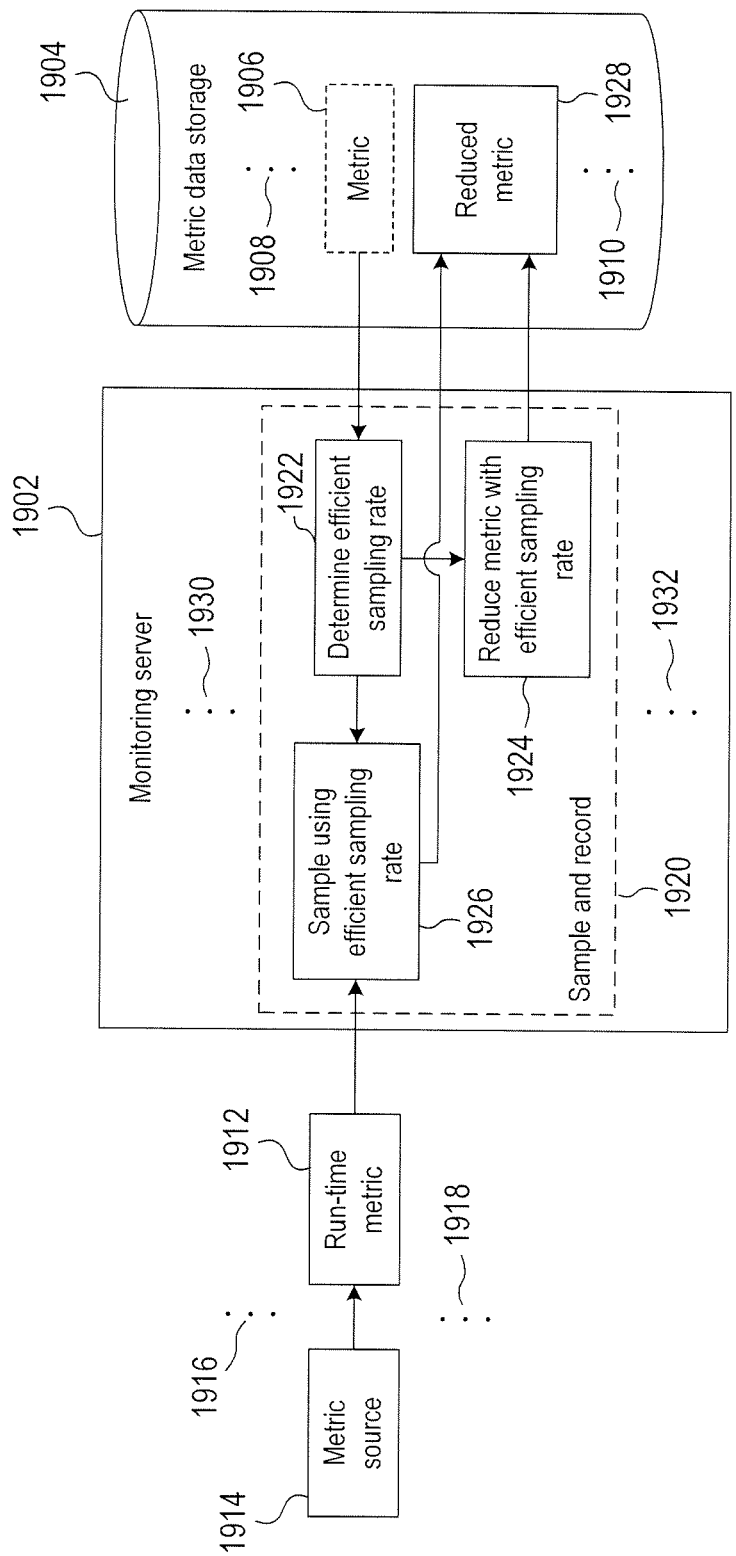
FIG. 19 shows an example of a monitoring server that determines an efficient sampling rate for each metric received and uses the efficient sampling rate to sample and record the metric in metric storage.

FIG. 19 shows an example of a monitoring server 1902 that determines an efficient sampling rate for each metric received and uses the efficient sampling rate to sample and record the metric in metric data storage 1904. In FIG. 19, dashed line block 1906 represents a metric recorded in the metric data storage 1904. Ellipsis 1908 and 1910 represent additional metrics stored in the metric data storage 1904 but are not represented for simplicity of illustration. The monitoring server 1902 receives run-time metric values 1912 from a metric source 1914. Ellipsis 1916 and 1918 represent additional run-time metrics generated by corresponding metric sources sent to the monitoring server 1902. The monitoring server 1902 performs a sample and record operation 1920. In block 1922, an efficient sampling rate is determined, as described below, based on the metric 1906 recorded in the metric data storage 1904. In block 1924, if the efficient sampling rate does not lead to an information loss, the efficient sampling rate may be used to reduce the metric 1906 by discarding redundant metric values as described below. In block 1926, the efficient sampling rate is used to reduce the number run-time metric values 1912. A reduced metric 1928 replaces the metric 1906, which occupies less storage space in the metric data storage 1904. On the other hand, if it is determined in block 1922 that reducing the metric 1906 leads to an unacceptable information loss, the run-time metric values 1912 and the metric 1906 are not reduced. Ellipsis 1930 and 1932 represent repeating the sample and record operations 1920 for other metrics sent to the monitoring server 1902 and stored in the metric data storage 1904.

The determination of an efficient sampling rate in block 1922 of FIG. 19 is performed by incrementally reducing the metric values of a recorded metric, creating a plurality of reduced metrics. Each reduced metric comprises a different subsequence of metric values of a metric. The efficient sampling rate used sample run-time metric values of a metric and resample the stored metric to reduce storage space is the sampling rate of the reduced metric with an acceptable information loss, as explained below.

Figure 20:
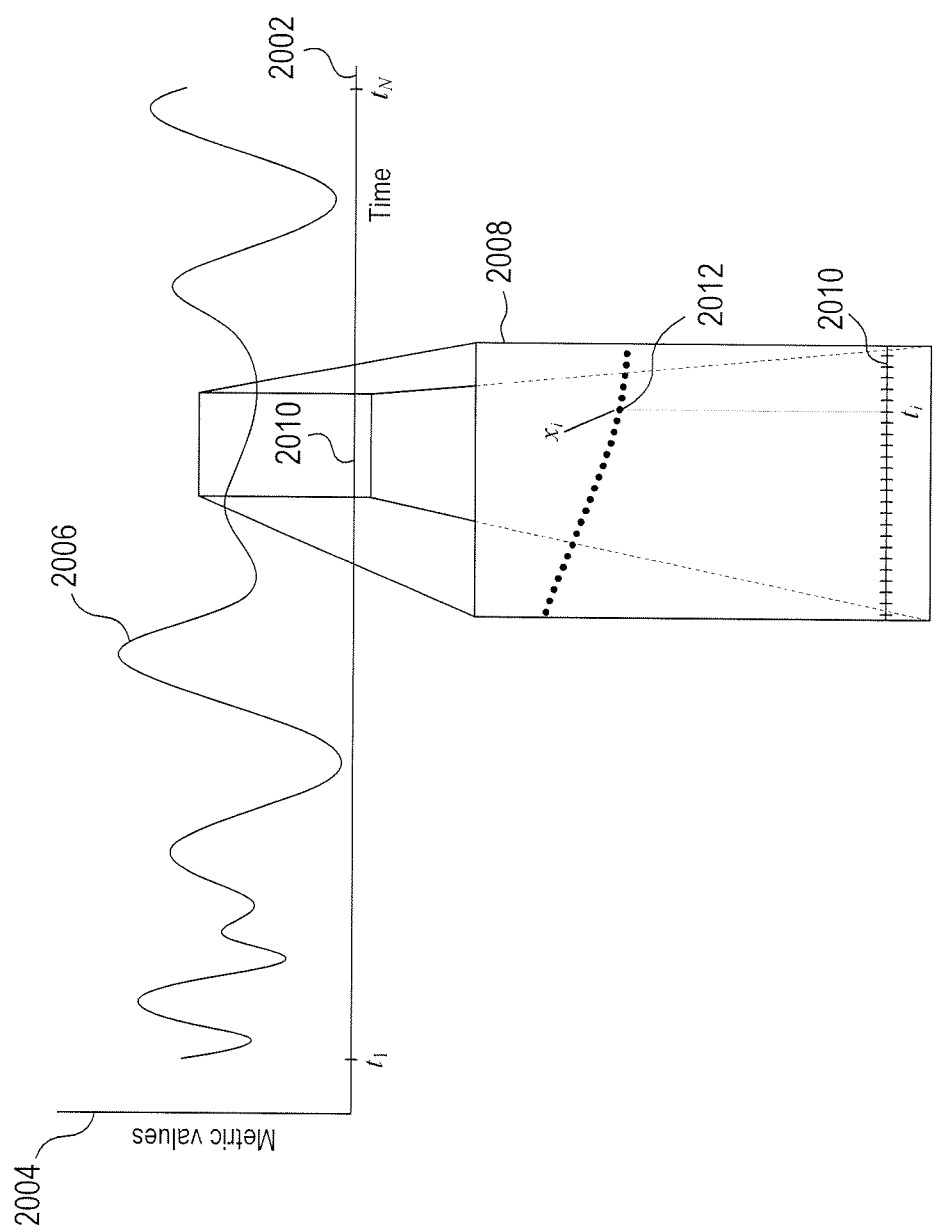
FIG. 20 shows a plot of a baseline metric.

FIG. 20 shows a plot of a metric initially recorded in metric data storage. Horizontal axis 2002 represents time. Vertical axis 2004 represents a range of metric values. Curve 2006 represents metric values recorded over a historical time window bounded by time stamps $t_1$ and $t_N$. FIG. 20 includes a magnified view 2008 of a portion of the metric 2006 in a time interval 2010, revealing metric values represented by solid dots at regularly space time stamps determined by a high-frequency sampling rate used to record metric values of the metric. For example, dot 2012 represents a metric value, $x_i$, recorded at a time stamp $t_i$. In the following discussion, the metric 2006 shown in FIG. 20 is used as a basis for constructing reduced metrics and assessing the information loss associated with each reduced metric.

The range of metric values, such as the range of metric values represented by vertical axis 2004, is partitioned into metric value intervals. Let K denote the number of intervals obtained from partitioning a range of metric values. A relative frequency of metric values in each metric value interval is computed for the metric by $$p_{0,k} = \frac{n_{0,k}}{N_{0,v}} \quad (3)$$

where
subscript k=1, 2, ..., K;
subscript "0" denotes a baseline metric;
$N_{0,v}$ is the number of metric values of the metric recorded in the historical time window; and
$n_{0,k}$ is the number of metric values in the k-th metric value interval of the range of metric values.

The relative frequencies form a metric distribution given by $$P_0 = \{p_{0,1}, \ldots, p_{0,K}\} \tag{4}$$

Figure 21:
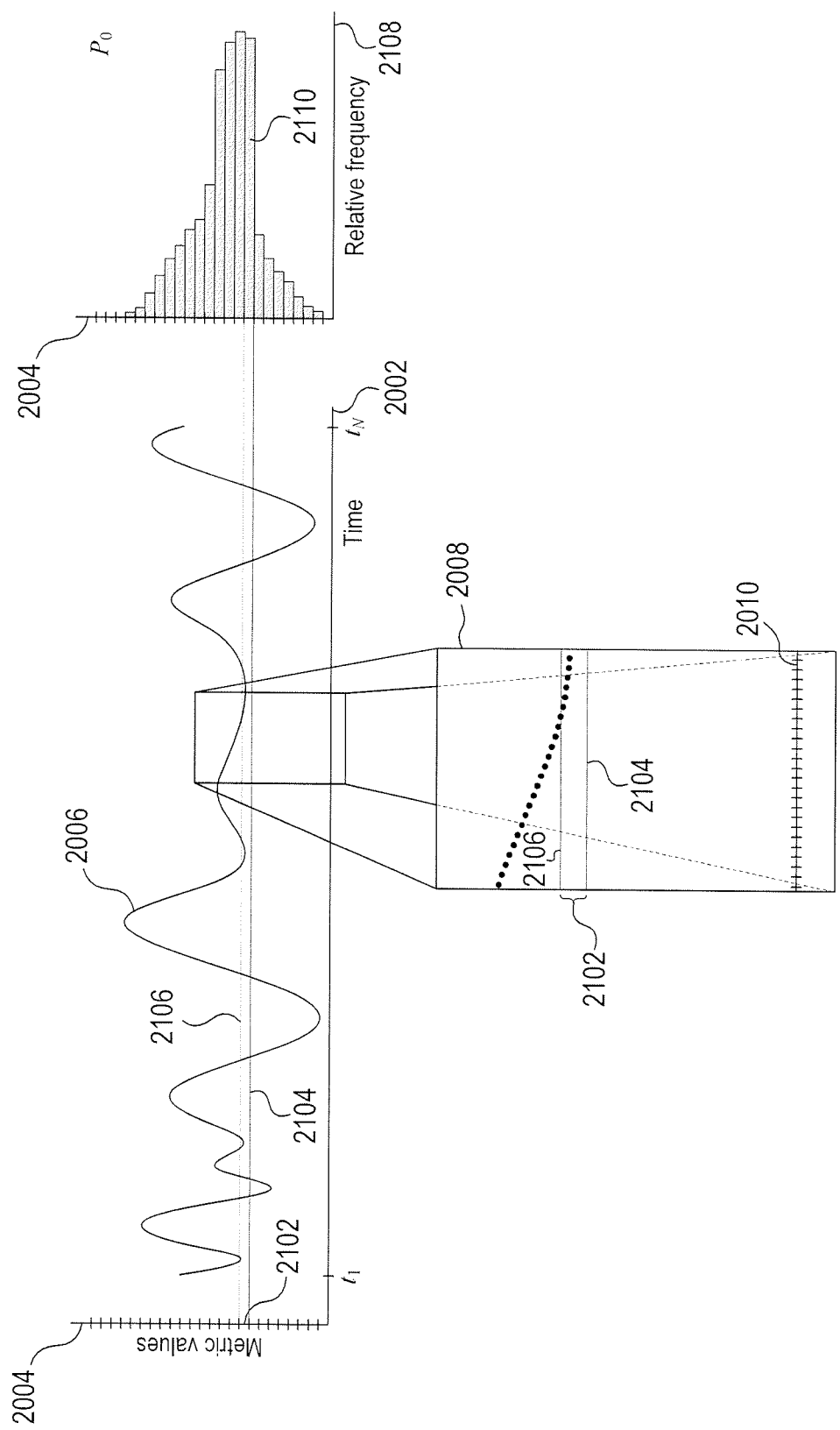
FIG. 21 shows construction of a baseline metric distribution $P_0$ from the metric shown in FIG. 20.

FIG. 21 shows construction of a baseline metric distribution $P_0$ from the metric shown in FIG. 20. The baseline metric distribution is created by partitioning the range of metric values into a plurality of adjacent metric value intervals. For example, the range of metric values represented by vertical axis 2004 is partitioned into intervals with the boundaries of each metric value interval identified by regularly spaced marks located along vertical axis 2004, such as metric value interval 2102. Each metric value interval encompasses a sub-range of the full range of metric values recorded within the historical time window. The number of metric values within each metric value interval is counted over the historical time window. For example, lines 2104 and 2106 extended parallel to the time axis 2002 over the historical time window represent boundaries of the metric value interval 2102. Metric values of the metric 2006 located between the boundaries 2104 and 2106 of the interval 2102 are counted. In magnified view 2008, six points of the metric are located between the boundaries 2104 and 2106. The number of metric values within each interval are divided by the number of metric values recorded in the historical time window to obtain the relative frequency of metric values in each metric value interval, as described above with reference to Equation (3). FIG. 21 shows a plot of an example baseline metric distribution $P_0$. Horizontal axis 2108 represents a range of relative frequencies. Each bar of the baseline metric distribution represents the relative frequency of metric values within a corresponding metric value interval of the range of metric values. For example, bar 2110 represents the relative frequency of metric values in the metric value interval 2102.

A number of reduced metrics are constructed from difference subsequences of the metric. Each reduced metric comprises a different number of metric values and has an associated sampling rate. For example, consider a metric originally recorded in metric data storage. Reduced metrics are determined by sequentially retaining larger subsequences of metric values. Starting with the first metric value $x_1$, every n-th metric value of the metric is retained and metric values between every n-th metric value are discarded to obtain a reduced metric:

$$v_{Reduced}^{(n)} = (x_1, x_{1+n}, x_{1+2n}, \ldots, x_{1+qn}, \ldots) \tag{5}$$

where
$v_{Reduced}^{(n)}$ is a subsequence of the metric v;
n is a positive integer step size; and
q is an integer $0 \leq q \leq (N_v - 1)/n$.

Initially, the step size n may be set to a large number and is decremented for each reduced metric. For example, the step size may initially be set to 20 (i.e., n=20). A first reduced metric may be constructed by retaining every $20^{th}$ metric value of the metric (i.e., discarding metric values between every 20-th metric value). A second reduced metric may be constructed by retaining every $19^{th}$ metric value of the metric (i.e., discarding metric values between every 19-th metric value). Subsequence reduced metrics are constructed by decrementing the step size.

A reduced metric distribution is constructed for each reduced metric constructed from a metric. The relative frequency of metric values in each metric value interval of the partitioned range of metric values is computed by $$p_{i,k} = \frac{n_{i,k}}{N_{i,v}} \tag{6}$$

where
subscript "i" denotes the i-th reduced metric;
$N_{i,v}$ is the number of metric values in the i-th reduced metric; and
$n_{i,k}$ is the number of metric values in the k-th metric value interval of the partitioned range of metric values.

The relative frequencies of the i-th reduced metric form an i-th reduced metric distribution given by $$P_i = (p_{i,1}, \ldots, p_{i,K}) \tag{7}$$

Figure 22A:
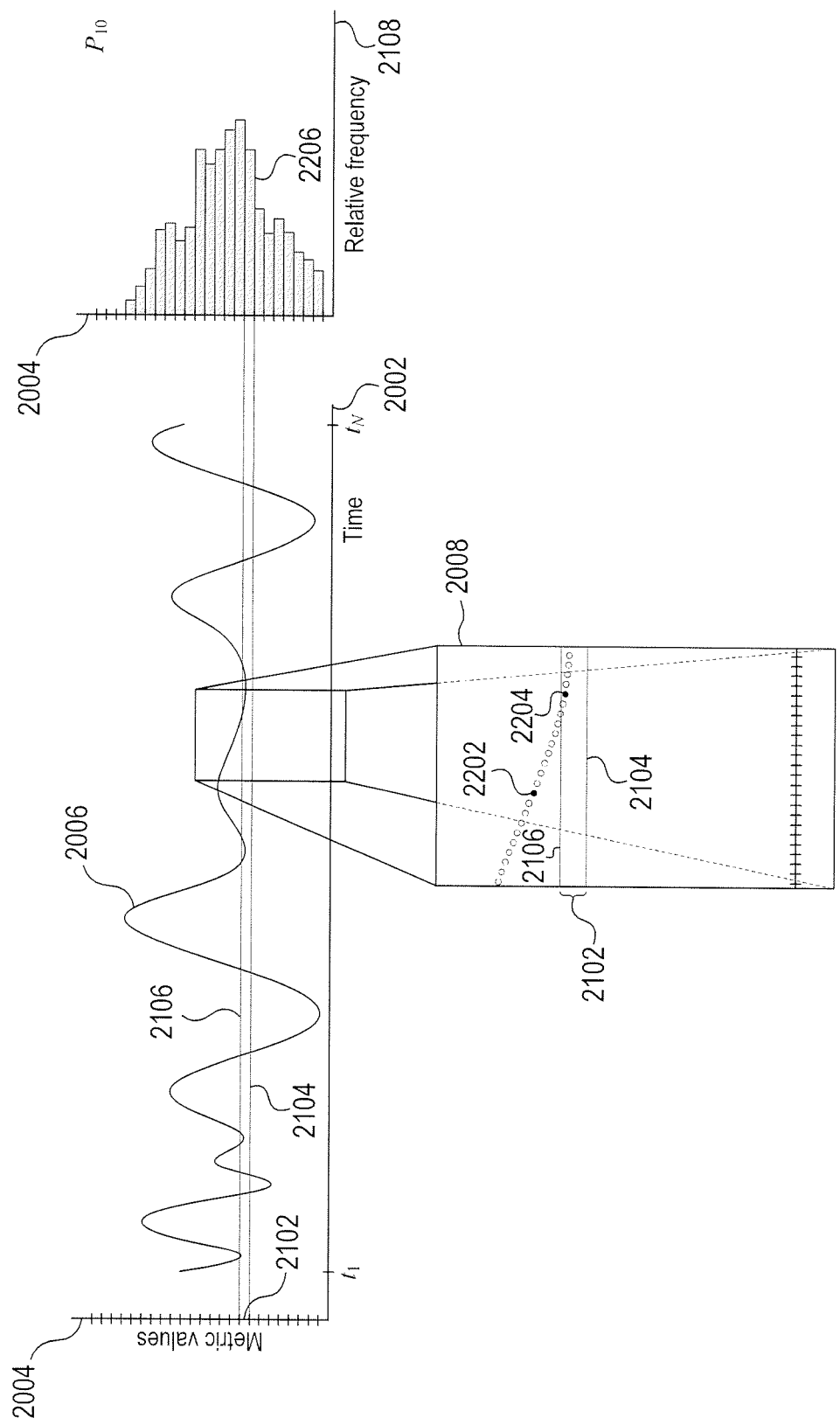
FIGS. 22A-22D show plots of reduced metrics and corresponding reduced metric distributions.
Figure 22B:
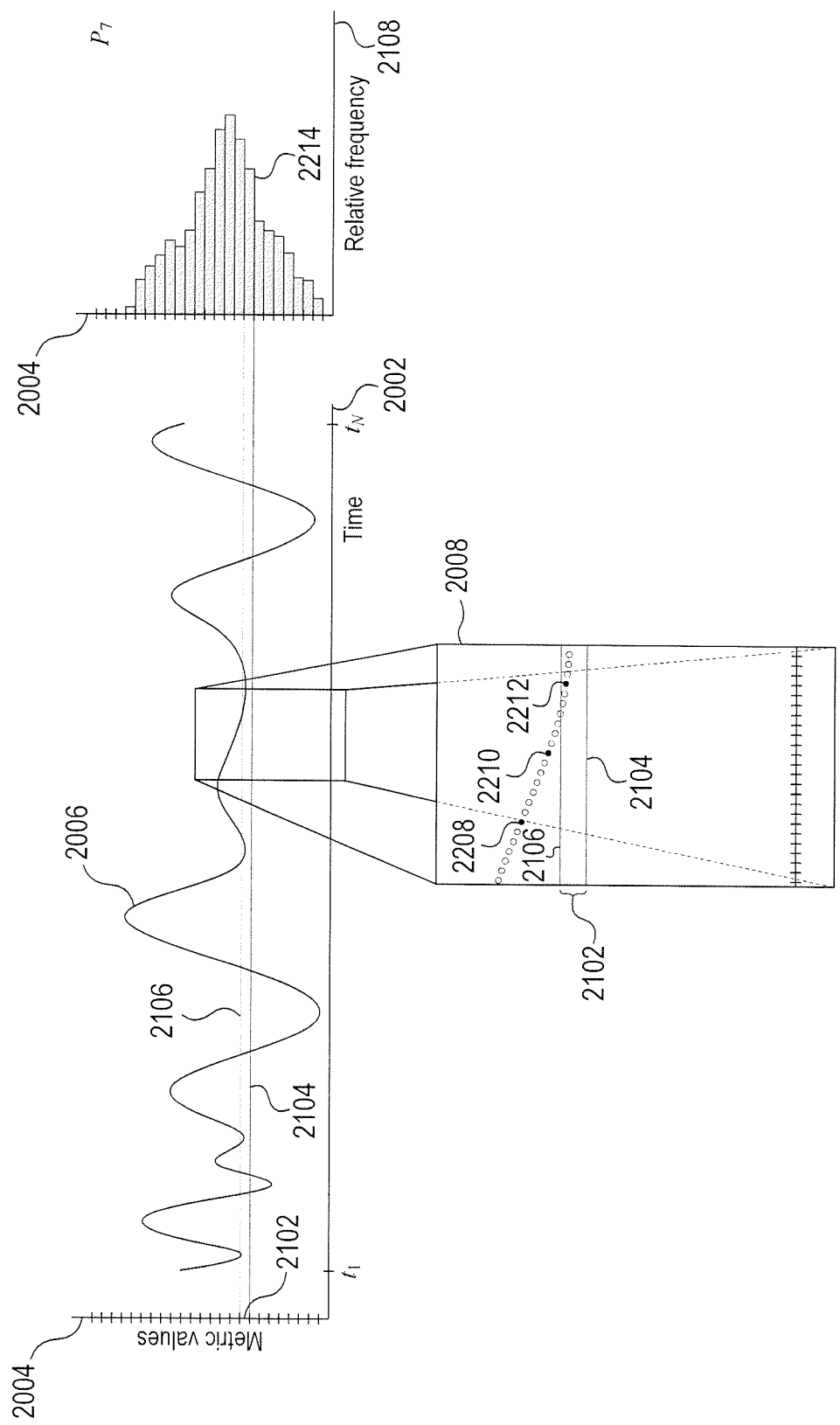
Figure 22C:
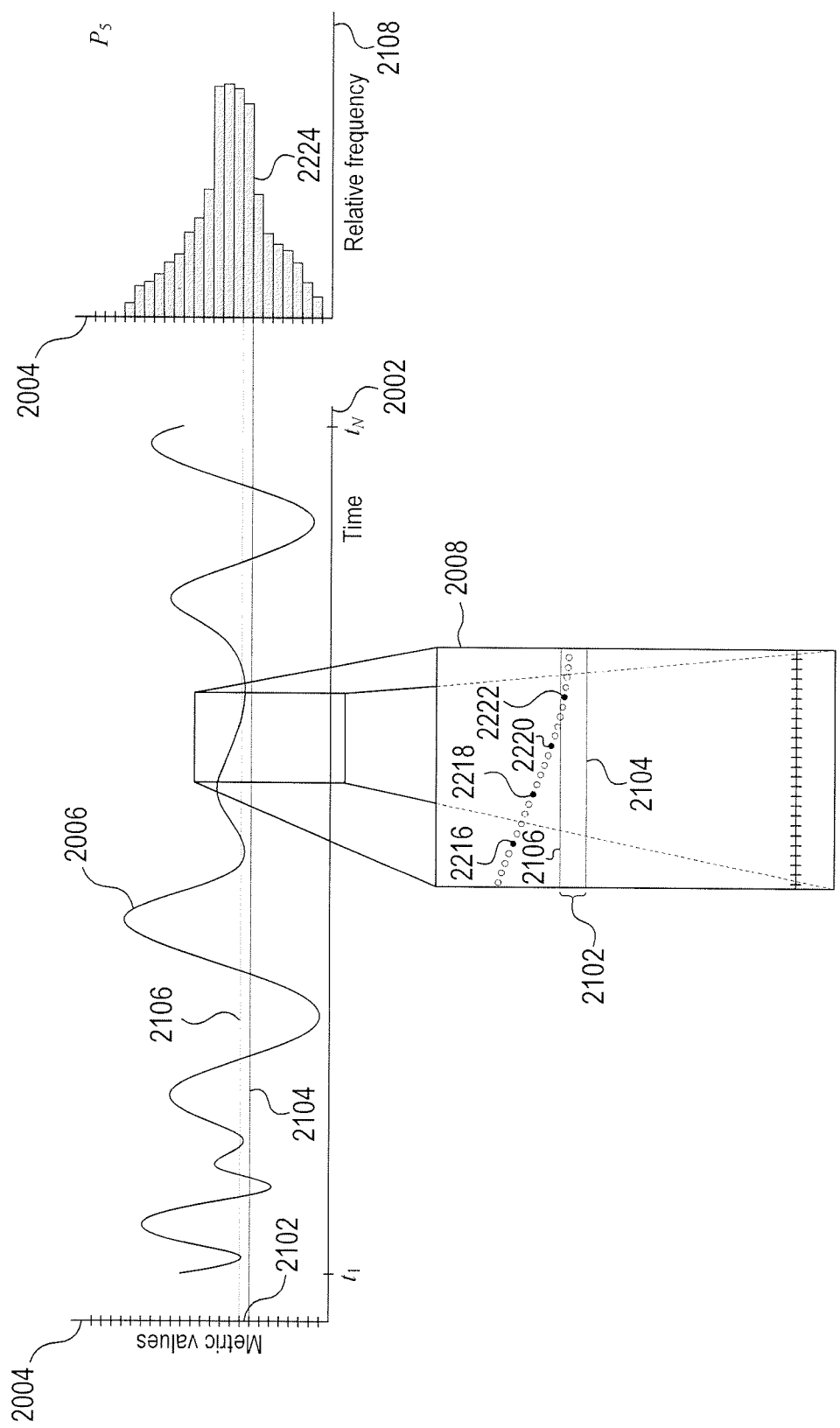
Figure 22D:
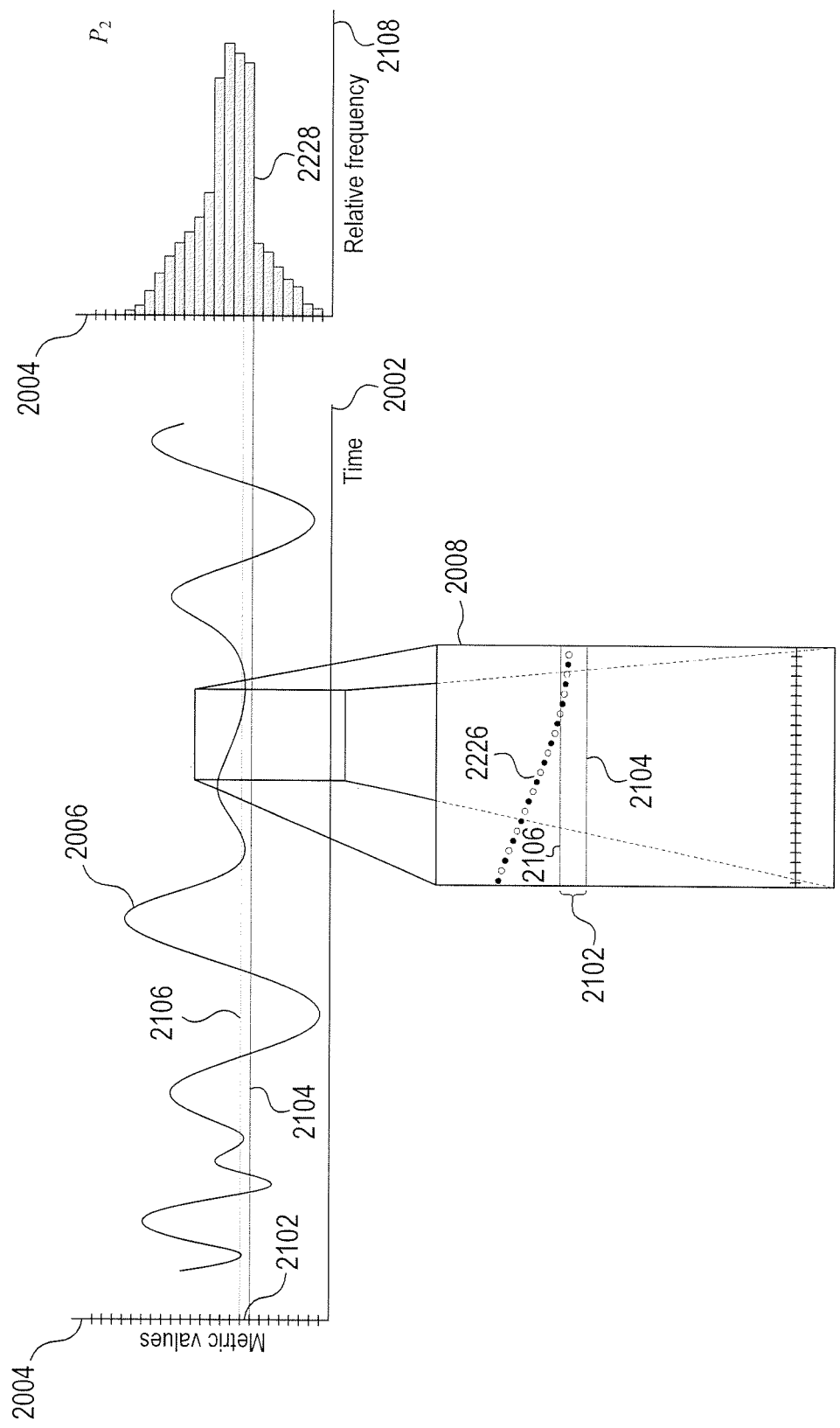

FIGS. 22A-22D show plots of examples of reduced metrics with respect to the metric in FIG. 21 and example corresponding reduced metric distributions for each reduced metric. Each reduced metric is constructed by retaining a different subsequence of metric values of the metric. In FIG. 22A, the metric is reduced by retaining every tenth metric value and discarding metric values of the metric between every tenth metric value of the metric. For example, in magnified view 2008 solid dots 2202 and 2204 represent retained metric values. FIG. 22A shows a plot of a reduced metric distribution $P_{10}$ computed from the reduced metric. For example, bar 2206 represents the relative frequency of metric values in the interval 2102. In FIG. 22B, the metric is reduced by retaining every seventh metric value and discarding metric values between every seventh metric value of the metric. For example, in magnified view 2008 solid dots 2208, 2210, and 2212 represent retained metric values. FIG. 22B shows a plot of a reduced metric distribution $P_7$ computed from the reduced metric. For example, bar 2214 represents the relative frequency of metric values in the interval 2102. In FIG. 22C, the metric is reduced by retaining every fifth metric value and discarding metric values between every fifth metric value of the metric. For example, in magnified view 2008 solid dots 2216, 2218, 2220, and 2222 represent retained metric values. FIG. 22C also shows a plot of a reduced metric distribution $P_5$ computed from the reduced metric. For example, bar 2224 represents the relative frequency of metric values in the interval 2102. In FIG. 22D, the metric is reduced by retaining every other metric value and discarding each metric value between every other metric value of the metric. For example, in magnified view 2008 solid dots, such as solid dot 2226, represent retained metric values resulting from retaining every other metric value. The relative frequencies are computed for each metric value interval of the range of metric values. FIG. 22D shows a plot of a reduced metric distribution $P_2$ computed from the reduced metric. For example, bar 2228 represents the relative frequency of metric values in the interval 2102.

Comparisons of each of the reduced metric distributions in FIGS. 22A-22D with the baseline metric distribution in FIG. 21 reveal that as the number of metric values retained for each reduced metric are increased, the corresponding reduced metric distributions converge on the baseline metric distribution. The difference between a reduced metric distribution and the baseline metric distribution indicates an information loss created by discarding metric values to of the metric to obtain the reduced metric. For example, the reduced metric distribution $P_{10}$ obtained from retaining every tenth metric value appears noticeably different from the baseline distribution $P_0$. By contrast, the reduced metric distribution $P_2$ obtained by retaining every other metric value is noticeably similar to the baseline metric distribution $P_0$.

Processes and systems compute an information loss for each reduced metric constructed from the metric based on the reduced metric distribution and the baseline metric distribution. The information loss is computed using the Jensen-Shannon divergence given by:

$$JSD(P_0, P_i) = -\sum_{k=1}^{K} m_{i,k} \log m_{i,k} + \frac{1}{2}\left[\sum_{k=1}^{K} p_{i,k} \log p_{i,k} + \sum_{k=1}^{K} p_{0,k} \log p_{0,k}\right] \quad (8)$$

where $$m_{i,k} = \frac{p_{i,k} + p_{0,k}}{2}$$

The Jensen-Shannon divergence lies between 0 and 1 and serves as a quantitative measure of the information loss in constructing a reduced metric from the metric. A Jensen-Shannon divergence value close to zero indicates the reduced and baseline metric distributions are similar and there has been little information lost in constructing the reduced metric. For example, if $JSD(P_0, P_i) \approx 0$, the baseline metric distribution $P_0$ and the reduced metric distribution $P_i$ are nearly identical and essentially no information has been lost in constructing the reduced metric. By contrast, the closer a Jensen-Shannon divergence value is to one, the further the reduced metric distribution is from the baseline metric distributions and information has been lost in constructing the reduced metric. For example, if $JSD(P_0, P_i) \approx 1$, the baseline metric distribution $P_0$ and the reduced metric distribution $P_i$ are substantially different and essentially little to no information contained in the metric has been retained in the reduced metric.

An information-loss threshold, denoted by $Th_{loss}$, may be used to quantitatively determine if the information loss in constructing a reduced metric is acceptable. When the following condition is satisfied $$Th_{loss} > JSD(P_0, P_i) \quad (9a)$$

the information loss in constructing the reduced metric associated with the reduced metric distribution $P_i$ is acceptable. By contrast, when the following condition is satisfied $$Th_{loss} \leq JSD(P_0, P_i) \quad (9b)$$

the information loss in constructing the reduced metric with the reduced metric distribution $P_i$ is not acceptable. The information-loss threshold may vary, depending on the resource, object, or complex computational system associated with the metric. Information-loss thresholds may, for example, range from about 0.01 to about 0.05. For example, an information-loss threshold may be 0.04. The sampling rate of a reduced metric with the largest information loss that does not exceed the information-loss threshold may be used as the efficient sampling rate.

Figure 23:
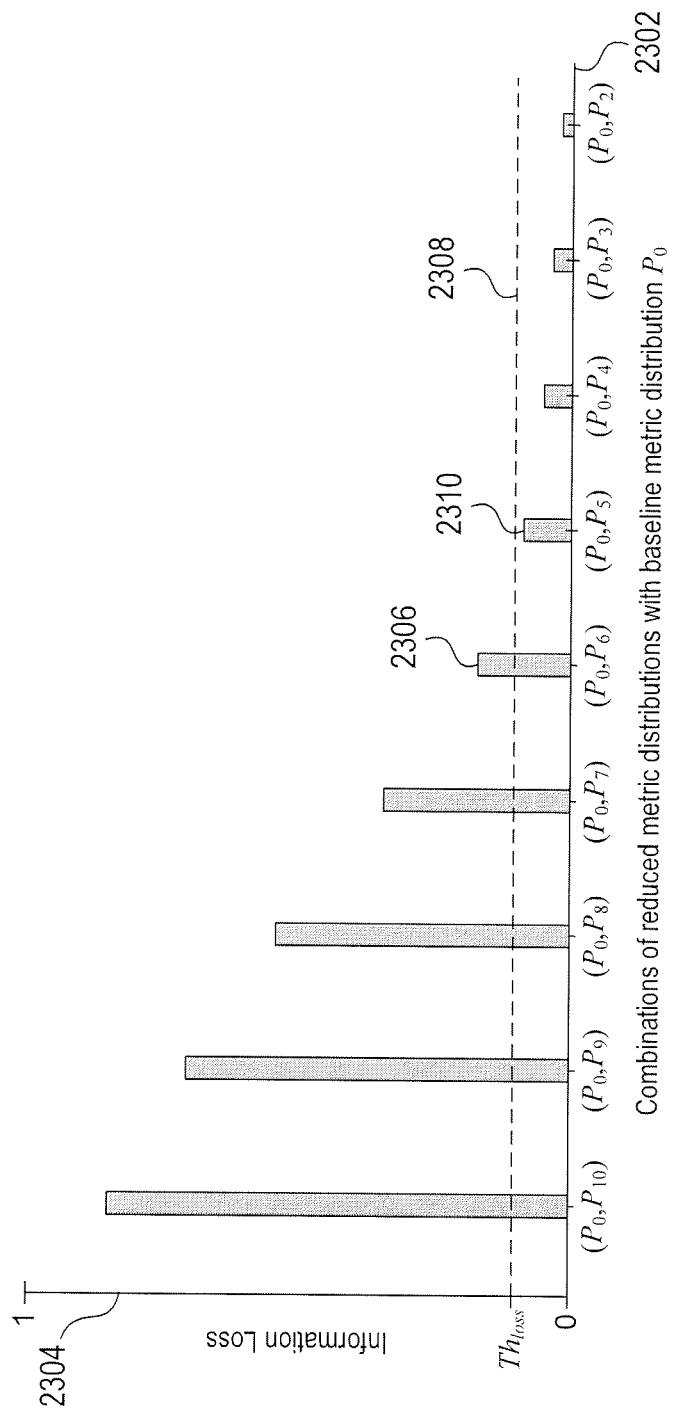
FIG. 23 shows a plot of example losses of information for reduced metrics.

FIG. 23 shows a plot of example losses of information for reduced metrics between a reduced metric obtained by retaining every tenth metric value and a reduced metric obtained by retaining every other metric. Combinations of reduced metric distributions with a baseline metric distribution are identified along horizontal axis 2302. Vertical axis 2304 is an information loss range between 0 and 1. Each bar represents an information loss between a reduced metric distribution and the baseline metric distribution, using the Jensen-Shannon divergence of Equation (8). For example, bar 2306 is the information loss in constructing a reduced metric obtained by discarding every sixth metric value of the metric based on the reduced metric distribution $P_6$ and the baseline metric distribution $P_0$. Dashed line 2308 represents an information-loss threshold, $Th_{loss}$. Reduced metrics with information losses less than the information-loss threshold 2308 are acceptable. On the other hand, reduced metrics with information losses greater than the information-loss threshold 2308 are not acceptable. The sampling rate of a reduced metric with the largest corresponding information loss that does not exceed the information-loss threshold 2308 is as an efficient sampling rate for the metric. For example, bar 2310 represents the largest information loss computed for a reduced metric obtained by discarding every fifth metric value from the metric.

An efficient sampling rate is the sampling rate of the reduced metric with the largest reduction in metric values and a corresponding information loss that does not exceed the information-loss threshold. When time stamps of the metric values are separated by a regular time interval, the efficient sampling rate is given by $$r_{efficient} = \frac{1}{\Delta t} \quad (10)$$

where $\Delta t$ is a regular time interval between consecutive time stamps of metric values of the reduced metric with the largest information loss less that is than the information-loss threshold.

On the other hand, when the time interval between consecutive time stamps is irregular or corrupted, the time interval may be approximated as the mode of the consecutive time stamps differences. The efficient sampling rate is given by $$r_{efficient} = \frac{1}{\text{mode}} \quad (11)$$

where mode is the mode of irregular time intervals between consecutive time stamps of metric values of the reduced metric with the largest information loss that is less than the information-loss threshold.

The efficient sampling rate may then be used to reduce the size of the metric recorded in metric data storage and reduce the number of run-time metric values of the metric sent to the monitoring server. For example, the metric recorded in metric data storage may be resampled according to the efficient sampling over the full history, thereby reducing the amount of storage space dedicated to the metric. Run-time metric values of the metric may be sampled at the efficient sampling rate applied to the metric value received from the metric source.

Figure 24:
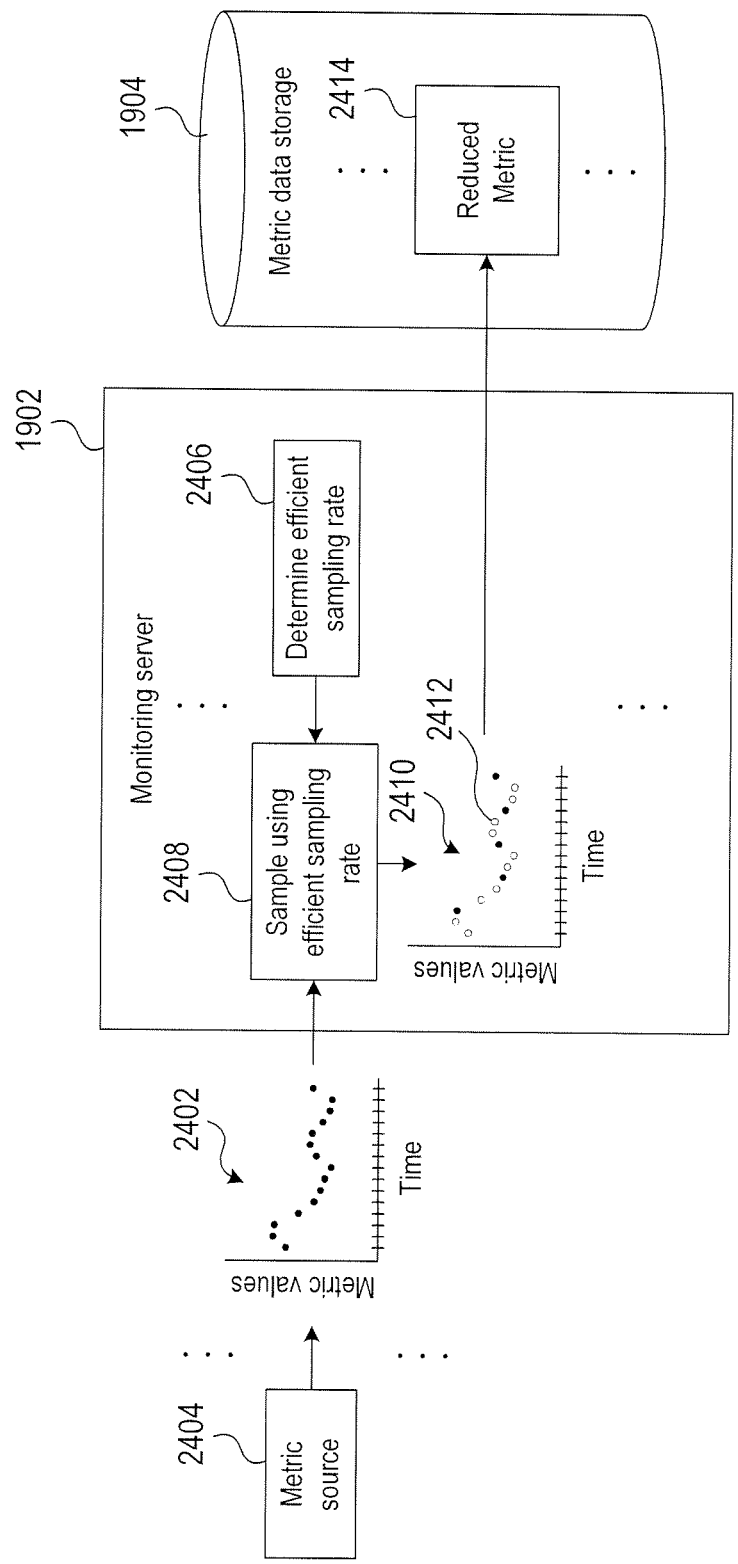
FIG. 24 shows an example of a monitoring server apply an efficient sampling rate to run-time metric values produced by a metric source.

FIG. 24 shows an example of the monitoring server 1902 sampling run-time metric values produced by a metric source at an efficient sampling rate. Plot 2402 shows a sequence of run-time metric values sent from a metric source 2404 to the monitoring server 1902. In the example of FIG. 14, an efficient sampling rate is determined in block 2406, as described above and used in block 2408. Plot 2410 shows the sequence of run-time metric values sampled according to the efficient sampling rate with discarded metric values represented by open dots, such as open dot 2412. The sampled metric values are then stored in the metric data storage 1904 as a reduced metric 2414.

Processes and systems may be used to reduces run-time and stored metric values of metrics to detect abnormal behavior of resource, objects, and complex computational systems. Processes and systems may execute remedial measures to correct the abnormalities. For example, if a resource or an object is discovered to exhibit abnormal behavior, remedial measures may be triggered. The remedial measures may include generating recommendations to correct the abnormal or potential abnormal state of the resource or object or the remedial measures may include automatically executing steps to correct the abnormal state, such as reconfiguring a virtual network of a VDC or migrating VMs, containers, or applications from one server computer to another. Remedial measures may include, but are not limited to, powering down server computers, replacing VMs disabled by physical hardware problems and failures, spinning up cloned VMs on additional server computers to ensure that the services provided by the abnormally behaving VMs are accessible to demand for services.

Figure 25:
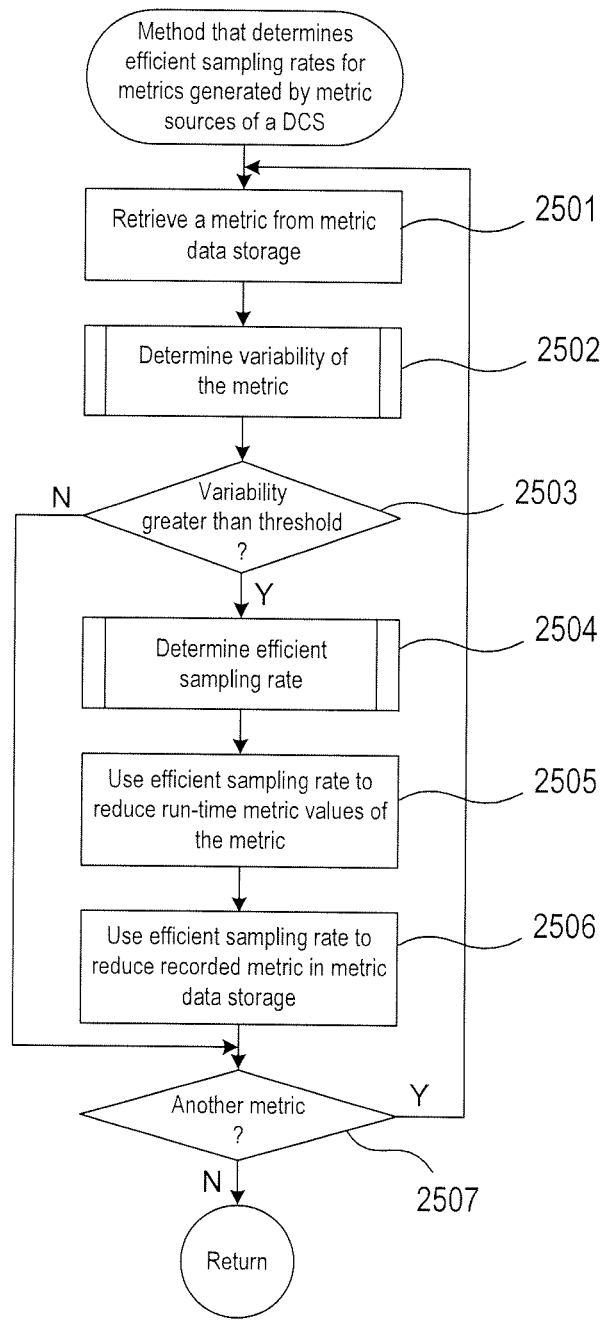
FIG. 25 is a flow diagram illustrating an example implementation a method that reduces storage of metrics generated by metric sources of a distributed computing system.
Figure 26:
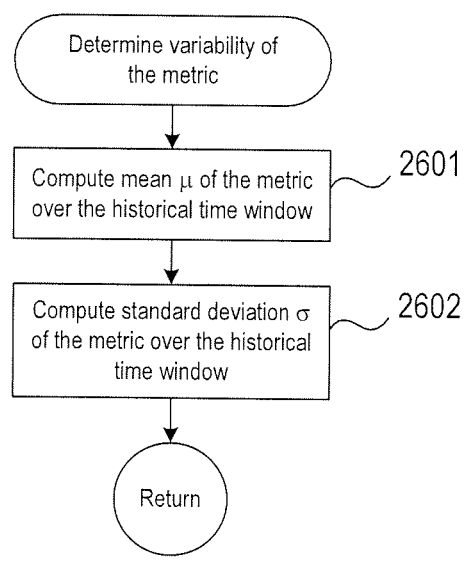
FIG. 26 is a flow diagram illustrating an example implementation of the "determine variability of the metric" step referred to in FIG. 25.
Figure 27:
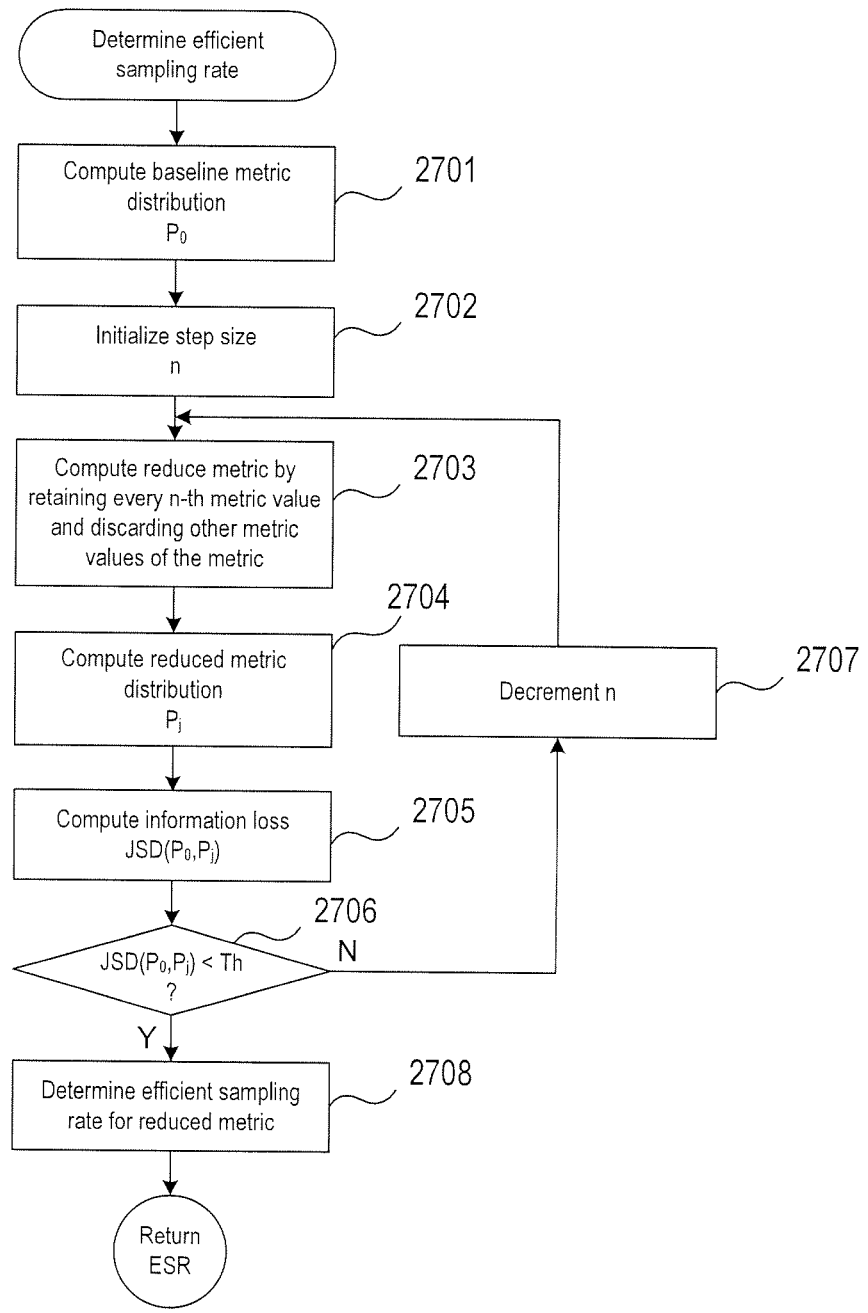
FIG. 27 is a flow diagram illustrating an example implementation of the "determine efficient sampling rate" step referred to in FIG. 25.

The methods described below with reference to FIGS. 25-27 are stored in one or more data-storage devices as machine-readable instructions that when executed by one or more processors of a computer system, such as the computer system shown in FIG. 1, determine the state of a complex computational system of a distributed computing system.

FIG. 25 is a flow diagram illustrating an example implementation a method that reduces storage of metrics generated by metric sources of a distributed computing system. In block 2501, a metric is retrieved from metric data storage, as described above with reference to FIG. 19. In block 2502, a "determine variability of the metric" procedure is performed. In decision block 2503, if the variability is greater than a variability threshold, control flows to block 2504. In block 2504, a "determine efficient sampling rate" procedure is performed. In block 2505, the efficient sampling rate determined in block 2504 is used to reduce the run-time metric values of the metric as described above with reference to FIG. 24. In block 2506, the efficient sampling rate determined in block 2504 is used to reduce the number of metric values of the metric recorded in metric data storage. In decision block 2507, the computational steps represented by blocks 2502-2506 are repeated for another metric in metric data storage.

FIG. 26 is a flow diagram illustrating an example implementation of the "determine variability of the metric" step referred to in block 2502 of FIG. 25. In block 2601, the mean of the metric is computed as described above with reference to Equation (2b). In block 2602, the standard deviation of the metric is computed as described above with reference to Equation (2a).

FIG. 27 is a flow diagram illustrating an example implementation of the "determine efficient sampling rate" step referred to in block 2504 of FIG. 25. In block 2701, a baseline metric distribution is computed for the metric as described above with reference to Equations (3) and (4) and FIG. 21. In block 2702, a step size denoted by n is initialized and used to create a reduced metric as described above with reference to Equation (5) and FIGS. 22A-22D. In block 2703, the metric is reduced by the step size to obtain a reduced metric, as described above with reference to Equation (5) and FIGS. 22A-22D. In block 2704, a reduced metric distribution is computed as described above with reference to Equations (6) and (7) and FIGS. 22A-22D. In block 2705, an information loss is computed between the reduced metric distribution and the baseline metric distribution using the Jensen-Shannon divergence given by Equation (8). In decision block 2706, when the information loss is greater than an information-loss threshold, as described above with reference to Equation (9a), control flows to block 2707. In block 2707, the step size is decremented. For example, the step size may be decremented by one. Alternatively, the step size may be decremented by two or more. On the other hand, when the information loss is less than the information-loss threshold, as described above with reference to Equation (9b), control flows to block 2708. In block 2708, an efficient sampling rate corresponding to the reduced metric with the largest information loss and is less than the information-loss threshold is determined as described above with reference to Equation (10) or Equation (11).

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process that determines an efficient sampling rate of a metric generated by a metric source of a distributed computing system, the improvement comprising:
   retrieving a metric from metric data storage;
   determining a plurality of reduced metrics based on the metric, each reduced metric comprising a different subsequence of metric values of the metric;
   determining an information loss for each reduced metrics with respect to the metric;
   determining an efficient sampling rate based on the information losses of the reduced metrics; and
   applying the efficient sampling rate to a stream of run-time metric values generated by the metric source, thereby reducing storage space of the run-time metric values.

2. The process of claim 1 further comprising applying the efficient sampling rate to metric values of the metric stored in the metric storage, thereby reducing storage space of the metric.

3. The process of claim 1 further comprises:
   computing a mean of metric values of the metric;
   computing a standard deviation of metric values of the metric based on the mean; and
   discarding the metric if the standard deviation is less than a standard deviation threshold.

4. The process of claim 1 wherein determining a plurality of reduced metrics comprises computing different reduced metrics, each reduced metric constructed by retaining a different subsequence of metric values of the metric and discarding metric values of the metric between the retained metric values.

5. The process of claim 1 wherein determining an information loss for each reduced metric with respect to the metric comprises:
   computing a baseline metric distribution of the metric; and
   for each reduced metric
      computing a reduced metric distribution, and
      computing information loss between the reduced metric distribution and the baseline metric distribution using Jensen-Shannon divergence.

6. The process of claim 1 wherein determining the efficient sampling rate comprises:
comparing the corresponding information loss of each reduced metric to an information-loss threshold;
identifying the reduced metric with the largest information loss that is less than the information-loss threshold as corresponding to the efficient sampling rate;
determining a sampling rate of the reduced metric; and
setting the efficient sampling rate to the sampling rate of the reduced metric.

7. The process of claim 1 wherein determining the sampling rate of the reduced metric comprises:
determining time intervals between time stamps of the reduced metric over the historical time window;
when the time intervals are regular time intervals, setting the sampling rate to the reciprocal of the time intervals; and
when the time intervals are irregular, setting the sampling rate to the reciprocal of the mode the intervals.

8. A computer system that reduces data storage space of a metric generated by a metric source of a distributed computing system, the system comprising:
one or more processors:
one or more data-storage devices; and
machine-readable instructions stored in the one or more data-storage devices that when executed using the one or more processors controls the system to execute operations comprising:
retrieving a metric from the one or more data storage devices;
determining a plurality of reduced metrics based on the metric, each reduced metric comprising a different subsequence of metric values of the metric:
determining an information loss for each reduced metrics with respect to the metric;
determining an efficient sampling rate based on the information losses of the reduced metrics;
applying the efficient sampling rate to a stream of run-time metric values generated by the metric source; and
recording the run-time metric values in the one or more data-storage devices.

9. The system of claim 8 further comprising applying the efficient sampling rate to metric values of the metric stored in the metric storage.

10. The system of claim 8 further comprises:
computing a mean of metric values of the metric;
computing a standard deviation of metric values of the metric based on the mean; and
discarding the metric if the standard deviation is less than a standard deviation threshold.

11. The system of claim 8 wherein determining a plurality of reduced metrics comprises computing different reduced metrics, each reduced metric constructed by retaining a different subsequence of metric values of the metric and discarding metric values of the metric between the retained metric values.

12. The system of claim 8 wherein determining an information loss for each reduced metric with respect to the metric comprises:
computing a baseline metric distribution of the metric: and
for each reduced metric
computing a reduced metric distribution. and
computing information loss between the reduced metric distribution and the baseline metric distribution using Jensen-Shannon divergence.

13. The system of claim 8 wherein determining the efficient sampling rate comprises:
comparing the corresponding information loss of each reduced metric to an information-loss threshold;
identifying the reduced metric with the largest information loss that is less than the information-loss threshold as corresponding to the efficient sampling rate;
determining a sampling rate of the reduced metric; and
setting the efficient sampling rate to the sampling rate of the reduced metric.

14. The system of claim 8 wherein determining the sampling rate of the reduced metric comprises:
determining time intervals between time stamps of the reduced metric over the historical time window;
when the time intervals are regular time intervals, setting the sampling rate to the reciprocal of the time intervals; and
when the time intervals are irregular, setting the sampling rate to the reciprocal of the mode the intervals.

15. A non-transitory computer-readable medium encoded with machine-readable instructions that implement a method carried out by one or more processors of a computer system to execute operations comprising:
retrieving a metric from metric data storage;
determining a plurality of reduced metrics based on the metric, each reduced metric comprising a different subsequence of metric values of the metric;
determining an information loss for each reduced metrics with respect to the metric;
determining an efficient sampling rate based on the information losses of the reduced metrics;
applying the efficient sampling rate to a stream of run-time metric values generated by the metric source; and
recording the sampled run-time metric values a metric data storage.

16. The medium of claim 15 further comprising applying the efficient sampling rate to metric values of the metric stored in the metric storage.

17. The medium of claim 1 further comprises:
computing a mean of metric values of the metric;
computing a standard deviation of metric values of the metric based on the mean; and
discarding the metric if the standard deviation is less than a standard deviation threshold.

18. The medium of claim 15 wherein determining a plurality of reduced metrics comprises computing different reduced metrics, each reduced metric constructed by retaining a different subsequence of metric values of the metric and discarding metric values of the metric between the retained metric values.

19. The medium of claim 15 wherein determining an information loss for each reduced metric with respect to the metric comprises:
computing a baseline metric distribution of the metric; and
for each reduced metric
computing a reduced metric distribution, and
computing information loss between the reduced metric distribution and the baseline metric distribution using Jensen-Shannon divergence.

20. The medium of claim 15 wherein determining the efficient sampling rate comprises:
comparing the corresponding information loss of each reduced metric to an information-loss threshold;
identifying the reduced metric with the largest information loss that is less than the information-loss threshold as corresponding to the efficient sampling rate;

determining a sampling rate of the reduced metric; and setting the efficient sampling rate to the sampling rate of the reduced metric.

21. The medium of claim 15 wherein determining the sampling rate of the reduced metric comprises:

determining time intervals between time stamps of the reduced metric over the historical time window;

when the time intervals are regular time intervals, setting the sampling rate to the reciprocal of the time intervals; and when the time intervals are irregular, setting the sampling rate to the reciprocal of the mode the intervals.

\* \* \* \* \*